United States Patent [19]

Burns

[11] 4,201,887
[45] May 6, 1980

[54] DATA TELECOMMUNICATIONS TERMINAL
[75] Inventor: Chester A. Burns, Palo Alto, Calif.
[73] Assignee: Cordura Marketing, Inc., Chicago, Ill.
[21] Appl. No.: 904,983
[22] Filed: May 11, 1978
[51] Int. Cl.² ........................................ H04M 11/00
[52] U.S. Cl. .................................. 179/2 DP; 364/900
[58] Field of Search ........................ 179/2 C, 2 DP; 364/200 MS File, 900 MS File

[56] References Cited
U.S. PATENT DOCUMENTS

| | | | |
|---|---|---|---|
| 3,771,132 | 11/1973 | Biewer | 364/900 |
| 3,932,709 | 1/1976 | Hoff et al. | 179/2 DP |
| 3,941,989 | 3/1976 | McLaughlin et al. | 364/900 |
| 3,956,740 | 5/1976 | Jones et al. | 364/900 |
| 3,976,840 | 8/1976 | Cleveland et al. | 179/2 DP |

OTHER PUBLICATIONS

*National Technical Report* (Japan), vol. 19, No. 6, pp. 624–631, Dec. '73, "The Portable Data Display Terminal VC-350", Nishiyama et al.

*Primary Examiner*—George G. Stellar

[57] ABSTRACT

A portable, hand-held data telecommunications terminal for use with a telephone system having a memory for storing data, a signal generator for generating signals corresponding to the data, a signal coupling device connected to the signal generator for coupling the signals to the telephone system, a keyboard, a microprocessor, and a self-contained power supply. The microprocessor is connected to the memory, the signal generator and the keyboard device so as to control, under the direction of the keyboard, the receipt of data from the keyboard, the storage of the data by the memory, and the generation of the signals by the signal generator. Data is entered into the memory from the keyboard device so that the data is available at a future time, to be coupled to the telephone system.

42 Claims, 13 Drawing Figures

DATA TELECOMMUNICATIONS TERMINAL

BACKGROUND OF THE INVENTION

1. Field of the Invention

The present invention relates to the field of electronic data storage and transmission devices, and more specifically to a telecommunications terminal for use with a telephone system.

2. Prior Art

Since the advent of Touch Tone telephone dialers, i.e., telephone dialers using push buttons and which generate dual-tone frequency signals for data transmission, there have been several devices developed which can store numerous frequently used telephone numbers and which can automatically dial such numbers upon actuation by the user. However, many of the existing repertory dialers are physically large and heavy, are not conveniently hand-held, do not possess a self-contained power supply capable of supporting full function operation, and must be electrically attached to the telephone system to be operational, all of which makes portable use of the dialers impractical and often impossible.

One example of such a non-portable repertory dialer is disclosed in U.S. Pat. No. 3,430,004 issued to Edwin Shenk. In the Shenk dialer the signal output of a push-button keyboard is converted by a memory device into a binary code signal. Each key on the keyboard is associated with a unique four bit code and is also represented by a unique series of pulses. Contained within the device is a magnetic tape and tape drive device, adapted such that when a key is depressed, the pulses corresponding to that particular key are recorded on the magnetic tape. When a number is to be recalled from the magnetic tape, there is a conversion of the pulses stored on the magnetic tape to the binary code representing the number so that a multifrequency tone can be electrically coupled to a telephone line. Thus, the Shenk device is non-portable in that it does not have a self contained power supply, it must be electrically attached to the telephone system, and it is relatively large and heavy because it contains the magnetic tape and drive system.

One example of a portable dialer is disclosed by the Charles Edward's articles in the January and February 1976 editions of "Radio Electronics". Edwards discloses a hand held data terminal which acoustically couples dual-tone signals to a telephone line. This data terminal has a keyboard, a dual-tone signal generator, an audio amplifier and a speaker for acoustically coupling the dual-tone signals to the telephone line. The Edward's device further has the capability to store one telephone number for future use by configuring a diode network within the device. However, the Edward's terminal is limited to the storage of a single telephone number, and to reprogram this single number, the diode matrix must be physically reconfigured.

Besides the mechanical, electrical, and human factors, reasons which greatly minimize the effectiveness of the prior art repertory devices being used for portable data communications terminals, their functional organizations bring about further problems. One problem can be seen when one considers what occurs when traveling across area code boundaries with a repertory dialer which unconditionally dials the entire contents of a given telephone number storage location. To be useful in the new area code location, such devices require that the entire contents of their memory be re-entered with the area code, and number of all telephone numbers not local to the new area code, while all numbers local to the new area code must be entered with the telephone number only. Thus, each time such a device is moved from one area code location to another area code location, a complete reprogramming of the device must be performed so as to provide proper telephone dialing.

Another problem of the prior art reperatory dialing devices is the inconvenient display of the telephone numbers which they are storing. Typically, such devices will display an unbroken series of digits which corresponds to the area code and telephone number of interest. From such an unbroken display, it is difficult to extract the telephone number from all the other digits being displayed.

Yet other problems of the prior art reperatory dialing devices include their inability to store a prefix number, which may be necessary to reach an outside telephone line, for example, and their inability to provide a time delay between the dialing of the prefix number and the telephone number.

Accordingly, it is a general object of the present invention to provide an improved portable data telecommunications terminal.

It is another object of the present invention to provide an improved portable data telecommunications terminal which has the capability of storage of a plurality of telephone numbers or other numerical data.

It is yet another object of the present invention to provide a portable data telecommunications terminal which has the capability of generating audible tones corresponding to the contents of its storage for purposes of either dialing a telephone number, or, transmitting stored information of any sort.

It is yet another object of the present invention to provide a portable data telecommunications terminal which has a self-contained power system so as to continously maintain the storage of data.

It is yet another object of the present invention to provide an improved data telecommunications terminal which has a convenient display format.

It is yet another object of the present invention to provide a portable data telecommunications terminal which automatically determines whether or not to dial an area code number prior to dialing the telephone number.

It is yet another object of the present invention to provide an improved data telecommunications terminal which automatically provides a delay between an access code and a telephone number.

SUMMARY OF THE INVENTION

A data telecommunications terminal for use with a telephone system is provided, the terminal having a keyboard for inputing data and for directing the processing of the data. The terminal further comprises a signal generator means, a memory means, and a microprocessing means which is coupled to the keyboard, the signal generator means and the memory means for processing the data. The microprocessing means contains a stored program consisting of a set of instructions, and control lines for providing commands which selectively direct the memory means to store the data and the signal generator means to provide dual-tone pair signals which correspond to the data. Finally, the terminal comprises a signal coupling means which is electrically connected to the signal generator means for acoustically coupling the dual-tone pair signals to the telephone system. In operation, a plurality of telephone numbers may be stored in the data terminal and later recalled so as to automatically dial the requested telephone number or transmit the desired data. The terminal provides for automatic determination of the necessity to dial an area code prior to dialing the telephone number, as well the automatic dialing of an area code when required. The terminal also has the ability to dial an access code and wait a predetermined length of time until the telephone number is dialed.

The novel features which are believed to be characteristic of the invention, both as to its organization and its method of operation, together with further objects and advantages thereof, will be better understood form the following description in connection with accompaning drawings in which a presently preferred embodiment of the invention is illustrated by way of example. It is to be expressly understood however, that the drawings are for purposes of illustration and description only and are not intended as a definition of the limits of the invention.

DETAILED DESCRIPTION OF THE INVENTION

Figure 1:
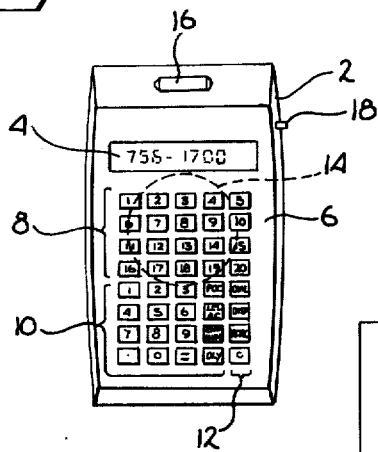
FIG. 1 is a top view of the exterior of the present invention.

Referring to FIG. 1, the exterior of the hand-held data telecommunications terminal 2 is shown as comprised of four main components. First, is a forty key keyboard 6 together with a dial trigger switch 18 through which the user controls all operations of the terminal 2. The second main component of terminal 2 is a nine digit display 4, through which the user may selectively examine the entire contents of the data stored in terminal 2. The third component of the terminal 2 is an acoustic speaker 14, located on the reverse side of terminal 2, from which the user may cause to be emitted dual-tone pair signals corresponding to the digits retained in the terminal 2. The fourth component of the terminal 2 is interface plug 16, through which the user may attach the device to a conventional AC adapter to provide power to the device or through which the user can electrically couple terminal 2 to a telephone network.

The keyboard 6 is divided into three functional groups of keys. The first functional group of keys are the data entry keys 10, comprised of digit keys 0-9, *, #, END NUM, and DLY. The second functional group of keys are the storage cell keys 8, comprised of cell keys 1-20, PDC and LCL A/C keys. The third functional group of keys of keyboard 6 are the function keys 12, comprised of DIAL, DISP, RCRD, and C keys.

The digits 0 through 9, and symbols * and # are the same as those found on the standard touch tone telephone dialing pad and are used to enter telephone numbers and other numerial data into terminal 2. The END NUM key is used to instruct the terminal 2 that all digits of a telephone number, area code or predial code have been entered. The DLY key is used to allow for a pause which may be required before an outside line can be connected and the telephone number dialed.

The storage cell keys 8, comprised of keys 1 through 20, and PDC, are used to store numbers (telephone or otherwise) of up to ten digits each. LCL A/C is also a storage cell key, and may store up to 4 digits. Each key of storage cell keys 1 through 20 provides access to a storage location for telephone numbers or other numerical data. The LCL A/C key is used to store the area code corresponding to the location of the terminal 2, and if required, a "0" to cause operator intervention or "1" to access the direct long-distance dialing equipment. As will be more fully described hereinbelow, terminal 2 will automatically compare the numbers stored in the local area code storage cell with the first three digets of a number which is to be dialed to determine if the number is local or long distance. Depending upon the result of this comparison, either seven or ten tones are generated, or if a "0" or "1" is stored in addition to the local area code, seven or eleven tones are generated. The PDC key is used to store a predial code, which can be a series of digits required to obtain an outside line through some telephone systems.

The DIAL key as well as the dial button 18 causes tones corresponding to a stored telephone number to be produced through the speaker 14 located on the back of terminal 2. The DISP key is used to display a telephone number, area code first, and, after a second depressing of the DISP key, the remaining seven digit number. The RCRD key is used to store a number in one of the digit storage locations. Finally, the C key is used to clear the terminal 2 of any data entered from the keyboard 6 or from data storage.

In operation, telephone numbers or any other data may be entered into the internal storage of terminal 2 by means of data entry keys 10. Each telephone number or other data may be entered into one of the twenty storage cell locations within terminal 2 by selecting one of the storage cell keys on keyboard 6. When it is desired to dial one of the telephone numbers stored within terminal 2 or when it is desired to transmit any other data stored within terminal 2 over a telephone line, terminal 2 is placed adjacent a telephone handset, such that speaker 14 is adjacent the microphone portion of the telephone handset. Then, to dial the telephone number selected from the storage within terminal 2, or to transmit the data stored within terminal 2, either the dial button 18 or the DIAL button contained in keyboard 6 may be depressed so as to cause the speaker 14 to emit dual-tone frequency signals which are acoustically coupled into the microphone of the telephone handset.

To further illustrate the operation of terminal 2, several examples of data storage and transmission will be described. To record a ten digit telephone number, including the area code and telephone number, the operator first sequentially presses the appropriate data entry keys 10 until the ten digits have been entered into terminal 2. Next, the operator presses the desired storage cell key 8 so as to store the newly entered telephone number in one of the twenty storage cell locations. For example, if it is desired to store the newly entered telephone number in storage cell location 3, the storage cell key numbered 3 is depressed. To finish the record sequence, the RCRD key is depressed so that the newly entered telephone number is transferred to and stored in one of the twenty storage cell locations within terminal 2.

To dial a telephone number, the operator would first press the storage cell key 8 which corresponds to the location of the telephone number desired. Speaker 14 is then placed firmly against the telephone mouthpiece. Finally, the operator presses the DIAL key or the dial button 18 on the side of terminal 2. This actuation of either the DIAL key or dial button causes the terminal 2 to emit the proper audible signals from speaker 14 into the telephone mouthpiece, and thereby dial the desired telephone number.

To display a telephone number, or display any data stored within terminal 2, the storage cell key 8 corresponding to the location of the desired telephone number or data is depressed. Next, the DISP key is depressed thereby causing the display 4 to display, in the case of a telephone number, the area code corresponding to the number in the storage cell. Finally, the DISP key is again depressed so as to display the remainder of the telephone number. In the case of 10 digit data other than a telephone number, the first depression of the display key causes the first three digits of the stored data to be displayed while the second depression of the display key causes the remaining seven digits to be displayed. If less than 10 digits are stored in a given cell, the first depression of the display key will cause all digits in that cell to be displayed at once. In the presently preferred embodiment, display 4 is a conventional LED display device, although a variety of other display means may be used.

To record the area code corresponding to the location of terminal 2, the operator first depresses the three or four digits of the local area code on data entry keys 10. Note that if it is required that a "0" or "1" be dialed before the area code, the "0" or "1" may be entered along with the other three digits of the area code via data entry keys 10. Next, the END NUM key is depressed. Then, the LCL A/C key is depressed to inform terminal 2 that a local area code number is being stored. Finally, the RCRD key is depressed so that the local area code is stored in the local area code storage location in terminal 2.

In some office telephone systems, a brief pause is required after dialing "9" but before an outside line can be connected. To record this predial code along with a pause in terminal 2, the operator first presses the number 9, or any other predial code digits up to eight digits in the data entry keys 10. Next, the operator presses the DLY key to instruct terminal 10 to insert a pause after the predial code is emitted. Then the operator sequentially presses the END NUM key and the PDC key. Finally, the operator presses the RCRD key so that the predial code and pause is stored in the storage location corresponding to the PDC key. Note that in some telephone systems, an indefinitely long pause is required before an outside line can be connected. In this case, the operator may press the DLY key twice in a row after recording up to seven digits of a predial code. This will cause the terminal 2 to halt until the DIAL or the dial button 18 is depressed a second time so that the user can wait for the outside line dial tone to be heard before proceeding with the dialing of the telephone number.

To dial a telephone number using the predial code feature, the operator first presses the PDC button to recall the predial code stored within terminal 2. Next, the operator selects one of the twenty numbers contained within the storage cells in terminal 2 via storage cell keys 8. After placing the speaker 14 snugly against the telephone mouthpiece, the operator presses the DIAL button on keyboard 6 or the dial button 18 so as to transmit the predial code over the telephone line. Assuming that the terminal 2 has been programmed to halt following the first dialing of the predial code due to the sequential insertion of two delay signals into terminal 2, terminal 2 will cease further dialing until the DIAL button is depressed again. Upon a second depression of the DIAL button, terminal 2 will automatically dial the telephone number via emission of dual-tone pair signals from speaker 14.

In addition to the basic functions of storing, dialing, and displaying telephone numbers, terminal 2 may also be used for a variety of other applications including the data transmission associated with merchandise order entry, utilities meter reading, electronic funds transfer, password generation, acoustic doorlock operation, remote operation of household appliances, and remote access of security systems. These other applications are facilitated by a queuing buffer portion of the memory contained within terminal 2. This buffer portion provides a temporary storage location where up to 30 digits of data may be assembled and stored. Thus, for example, the operator's merchant code may be stored in one cell location, and his charge account number located in another cell location. If the operator desired to make a merchandise order entry by means of terminal 2, he would transfer his merchant code and charge account number into the queuing buffer. He would then add the digits corresponding to the merchandise to be ordered into the buffer via keyboard 14. If desired, he could then display the entire sequence of digits corresponding to his merchant code, charge account number and merchandise code on display means 4 so as to validate the data prior to transmission. Finally, the entire contents of the queuing buffer may be transmitted over the telephone lines by depressing either of the dial buttons. Of course, terminal 2 may also be used to store important numbers of other types, including social security numbers, safe combinations, safe deposit box numbers, etc.

Figure 2:
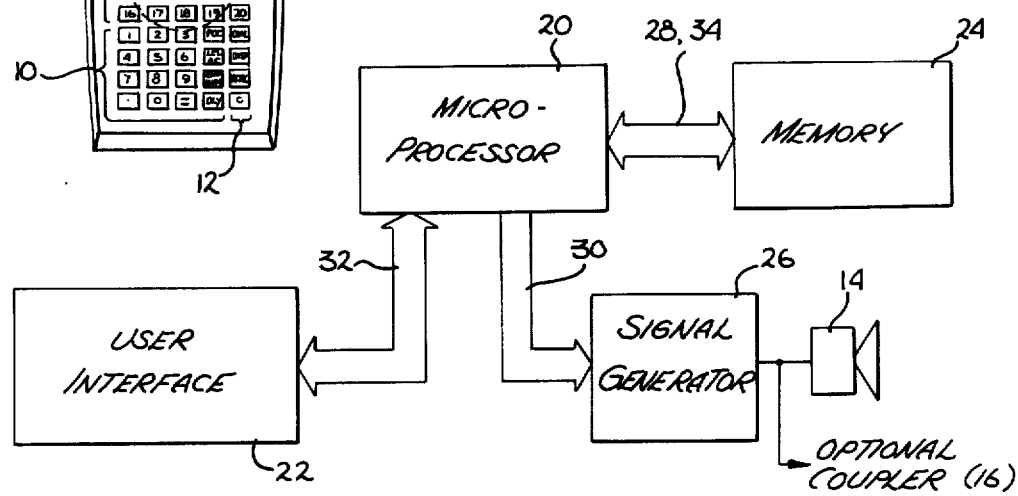
FIG. 2 is a block diagram of the system of the present invention.

FIG. 2 is a simplified block diagram of the circuitry contained within terminal 2. A user interface means 22 is connected to a microprocessor 20 by a data bus 32. The microprocessor 20 is connected, in turn, to a memory means 24 by a data bus 28, 34. The microprocessor 20 is also connected to a signal generator means 26 by a data bus 30. Finally, coupled to the signal generator 26 are signal coupling means, comprised of a speaker 14 and an optional coupler 16. In the presently preferred embodiment, microprocessor 20 is a General Instrument microprocessor computer, model number PIC1650. Also, in the presently preferred embodiment, memory means 24 is a commercially available complementary metal-oxide-silicon (CMOS) random access memory (RAM), while signal generator 26 is a commercially available device manufactured by, Intersil, model number 7206. Of course, a variety of other microprocessors, memory devices and signal generators may be used in the present invention.

It can be seen from FIG. 2 that data may be entered into the microprocessor 20 from user interface 22 via data bus 32. The microprocessor 20 may then direct the storage of portions of this data in the memory device 24 or activate the signal generator 26 so as to couple this data to telephone lines via the speaker 14 or coupler 16. Also, data stored in the memory device 24 may be displayed at the user interface 22.

Figure 3:
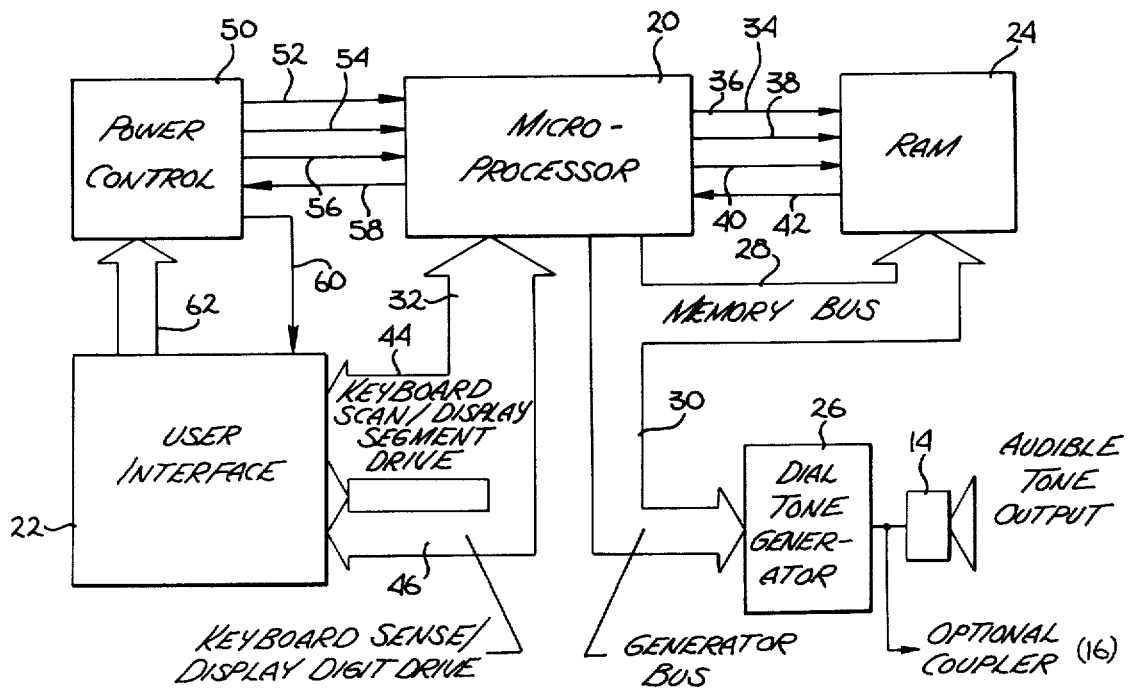
FIG. 3 is a block diagram showing in greater detail the electrical components of the present invention.

FIG. 3 illustrates in greater detail the circuitry contained within the terminal 2. The user interface 22 is coupled to the microprocessor 20 by a data bus 32, which is comprised of a keyboard scan/display segment drive portion 44 and a keyboard sense/display digit drive portion 46. In the presently preferred embodiment, user interface 22 is comprised of a keyboard and a display means. However, other means for inputting data may, of course, be used with the present invention. Providing power control to both the microprocessor 20 and user interface 22 is the self-contained power control means 50. The user interface 22 is coupled to the power control means 50 by data bus 62, as well as VCC output line 60. The power control means 50 is coupled to the microprocessor 20 via lines 52, 54, 56, and 58. Line 52 provides VCC power to the microprocessor 20, line 54 provides a master clear signal to the microprocessor 20, line 56 provides a low voltage detector signal to the microprocessor 20, and line 58 provides a power off signal from the microprocessor 20 to the power control means 50.

Microprocessor 20 is connected to memory storage device 24 by memory bus 28 and memory control lines 34. Memory control lines 34 are comprised of a write enable signal line 36, a strobe signal line 38, a data out signal line 40 and a data in signal line 42. Microprocessor 20 is also coupled to dual-tone generator 26 by a generator bus 30. Dual-tone generator 26 is coupled, in turn, to speaker 14 and optional coupler 16.

As will be described more fully hereinbelow, microprocessor 20 is programmed with a set of instructions so as to receive and process data provided by user interface 22, direct the storage of this data in memory means 24, and transmit this data via dial tone generator 26. Program instructions within microprocessor 20 direct microprocessor 20 to scan the keyboard 6 in user interface 22 to detemine if one of the plurality of keys in the keyboard 6 has been depressed. When microprocessor 20 determines that one of the keys of keyboard 6 has been depressed, other instructions within microprocessor 20 direct the microprocessor to determine which of the plurality of keys has been depressed via the keyboard sense portion 46 of data bus 32.

Once microprocessor 20 has determined which key of keyboard 6 has been depressed, and depending upon which key has been depressed, microprocessor 20 will either accept the data being input, or perform the processing directed by the key which has been depressed. Thus, microprocessor 20 may store data in the RAM 24 via lines 34 and bus 28, or it may retrieve data from RAM 24. In addition, microprocessor 20 may have been directed by one of the keys of keyboard 6 to cause the transmission of a dual-tone signal which corresponds to data which it is processing. In this latter case, microprocessor 20 will direct dual-tone generator 26, via generator bus 30, to cause the emission of an audible tone by speaker 14. Of course, speaker 14 may be bypassed by the optional coupler 16 so as to directly electrically couple generator 26 to the telephone system.

As will be described more fully hereinbelow, power control means 50 directs the power distribution from a battery within terminal 2 to the components of terminal 2. Prior to the actuation of a key on keyboard 6, no power is provided to any of the components of terminal 2 other than the continously powered RAM memory 24 and, of course, the power control components themselves. Because the presently preferred embodiment of terminal 2 utilizes a CMOS RAM device, extremely little power is consumed in order to maintain storage of data within the RAM 24. When a key on keyboard 6 is depressed, power control means 50 senses this key depression via bus 62. Power control means 50 then provides power to the other components of terminal 2 including microprocessor 20, display means 4 of user interface 22, and dual-tone generator 26. This power to components of terminal 2, other than RAM 24, is maintained as long as microprocessor 20 continues its processing of the data provided by user interface 22. When microprocessor 20 has completed its processing, context data and user data necessary for subsequent processing are re-stored in RAM 24. At this time microprocessor 20 provides a power off signal to power control means 50. Following receipt of this power off signal by power control means 50, power control means 50 terminates the supply of power to all components within terminal 2 other than the small amount of power necessary to maintain data in RAM 24.

It can be seen from the above description that the power control means 50 obviates the need for an on/off switch, a feature which provides three distinct advantages to terminal 2. First, power control means 50 prevents the inadvertant discharge of the battery within terminal 2, thereby insuring the retention of data in the continously powered RAM 24. This feature is particularly important in the present invention in that it provides reliable maintenance of the content of the terminal's memory, which is an essential feature of operation both in terms of general utility and also preventing the destruction of what may be irreplaceable data.

Second, power control means 50 provides the advantage of an extremely low duty cycle for the comparatively high current components within terminal 2 (that is, all components except the RAM 24 and the components comprising the power control means 50). As a result, the interval between recharge of the battery used in terminal 2 will be approximately one month with approximately 40 percent of battery capacity remaining, assuming a normal use of approximately fifty telephone calls per day. Third, power control means 50 provides a superior human factors feature. Terminal 2 may be used with only two key strokes to dial a telephone number so that it is not necessary to operate an on/off switch both prior to and after dialing with terminal 2.

Figure 4:
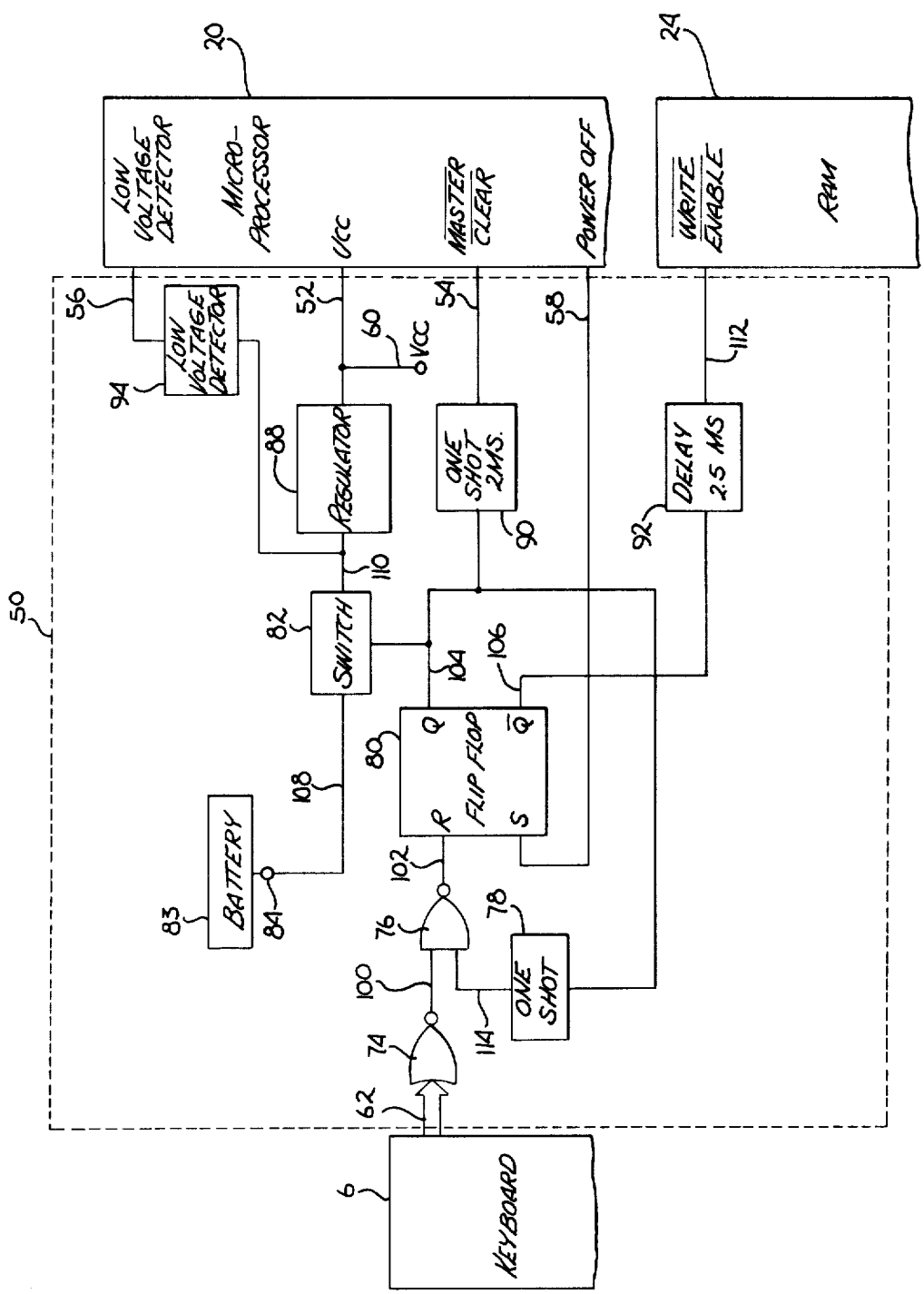
FIG. 4 is a block diagram showing in greater detail the power control means of the present invention.

FIG. 4 illustrates in greater detail the internal circuitry of power control means 50. Keyboard 6 is coupled to NOR gate 74 by bus 62. NOR gate 74 is coupled to NAND gate 76 by line 100, while NAND gate 76 is coupled to the R input of flip-flop 80 by line 102. The Q output of flip-flop 80 is coupled by line 104 to one shot 78, and one shot 78 is coupled to the input of NAND gate 76 by line 114. The Q output of flip-flop 80 is also coupled to switch 82 by line 104. The input of switch 82 is coupled to the battery 83 via terminal 84 and line 108. The output of switch 82 is coupled to regulator 88 by line 110, while the output of regulator 88 is coupled to the VCC input of microprocessor 20 by line 52. The regulator 88 also provides VCC output to other portions of the circuitry via terminal 60. Also coupled to the output of regulator 88 is low voltage detector 94 whose output is coupled to the low voltage detector input of microprocessor 20 by line 56.

Also coupled to the Q output of flip-flop 80 is one shot 90 which is, in turn, coupled to the master clear input of microprocessor 29 by line 54. Microprocessor 20 provides a power off signal which is coupled to flip-flop 80 input S via line 58. The Q output of flip-flop 80 is coupled to delay means 92 via line 106. In the presently preferred embodiment, delay means 92 is a conventional resistor-capacitor circuit, although a variety of other designs may be used to bring about the necessary delay. The output of delay means 92 is coupled to write enable input of RAM 24 by line 112.

The power control means 50 operates in the following manner. Power control means 50 detects a keyboard 6 closure via a low going signal on any of the keyboard column lines of bus 62 which in turn is gated by spurious closure inhibit gate 76. When a valid keyboard closure signal is admitted by gate 76, the flip-flop 80 is set to a high condition at Q output, which in turn activates the main power switch 82. The main power switch in turn couples the voltage regulator 88 to the battery 83 at terminal 84 so as to provide VCC on line 52 and subsequently provide VCC to all components.

Simultaneously with the main power switch 82 being activated, a write enable inhibit line 112 is also activated by the output of delay means 92. This delay means 92 contains a timing network which will allow write operations to the RAM 24 only after it is certain VCC is stable, all VCC powered components are operating normally, and the processor 20 is properly initialized. In the presently preferred embodiment, the delay of the timing network 92 is approximately 2.5 milliseconds.

When the task indicated by the particular keystroke is completed, the microprocessor 20 issues a power off signal on line 58 to the flip-flop 80, and VCC is then turned off following the reset of flip-flop 80. In order to prevent spurious keystrokes from being simulated by the processor bus 32, which is in parallel with the keyboard column lines of bus 62, as VCC transitions from plus five volts to ground, the spurious closure inhibit gate 76 is deactivated by the low going flip-flop output line 104. The resulting high condition at line 114 of spurious closure inhibit gate 76 is insured for a minimum period of time by one shot 78. In the presently preferred embodiment, one shot 78 provides a high signal at line 114, when activated by a signal at line 104, for a period of 10 milliseconds.

Figure 5:
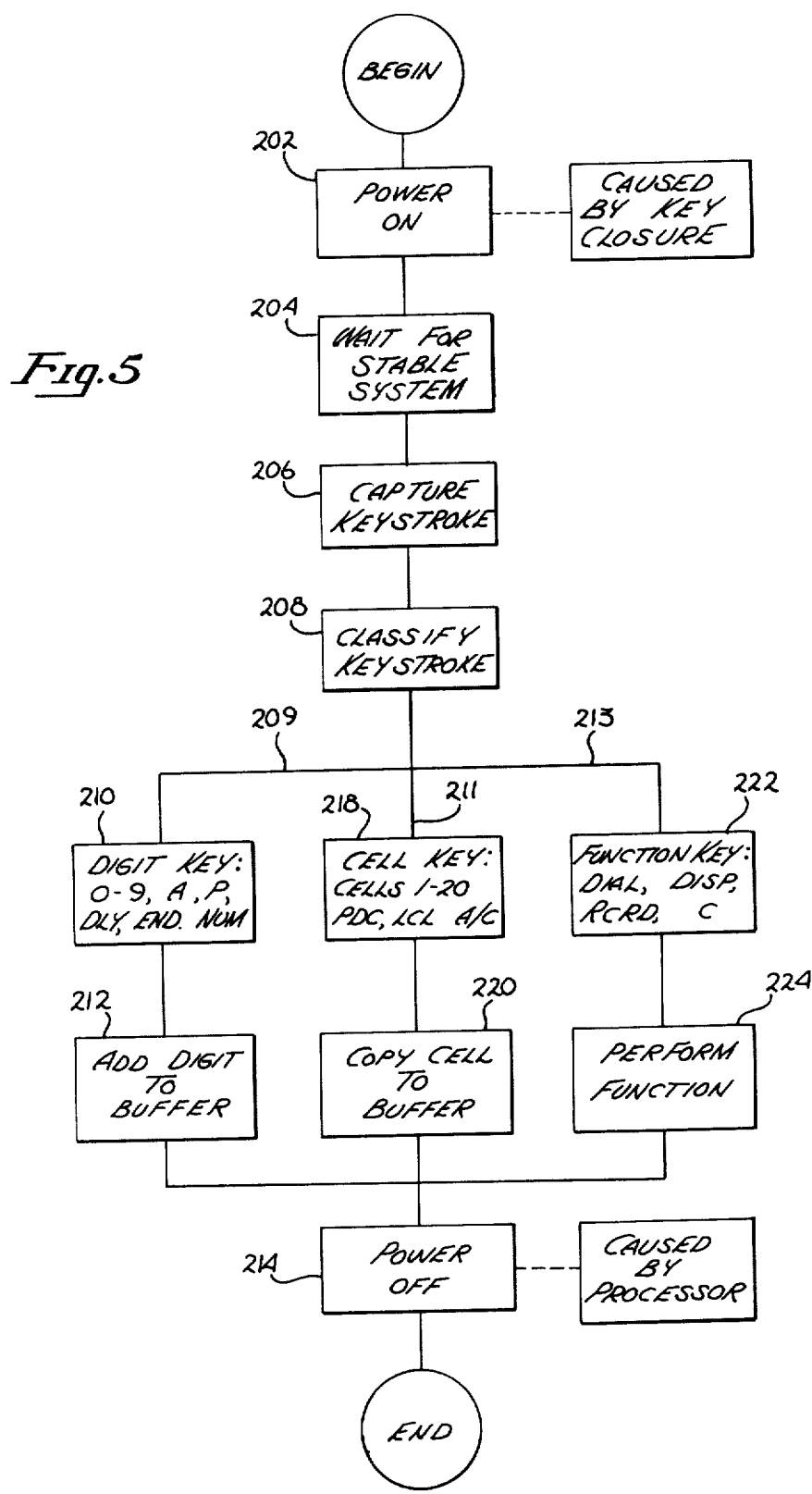
FIG. 5 is a flow diagram of an over view of the microprocessor program of the present invention.

FIG. 5 illustrates an overview of the set of instructions comprising the program contained in microprocessor 20. As described hereinabove, power is turned on in block 202 by a key closure. As noted in block 204, the program then waits for the system to stabilize. At block 206 the program performs numerous steps to determine which key on keyboard 6 has been depressed. Block 208 illustrates a branching routine which is used to classify which type of key on keyboard 6 was pressed. Thus, if a digit key had been depressed, instruction path 209 would be followed such that the data corresponding to the digit key will be processed by block 210 and the data ultimately added to the queuing buffer portion of the RAM 24 at block 212. The queuing buffer portion of the RAM 24 is a novel and useful arrangement of storage, wherein the user may assemble data from other "permanent" locations, thereby allowing the construction of complex sequences which may be validated prior to dialing and, moreover redialed (or retransmitted to a computer via telephone lines) without reentry of the data.

On the other hand, if a cell key had been depressed, instruction path 211 would be followed so that the cell key instruction will be processed by block 218 and the cell information copied to the RAM 24 buffer by block 220. Finally, if block 208 determines that a function key had been depressed, instruction path 213 would be followed so that the data corresponding to the function key would be processed by block 222 and the function performed by block 224. Following the appropriate processing of the key, regardless of the key type, power off instructions are executed, as indicated by block 214, and the program is terminated. In the following the programing instructions which make up the blocks illustrated in FIG. 5 will be described in detail by way of the block diagrams illustrated in FIGS. 6 through 13.

Figure 6:
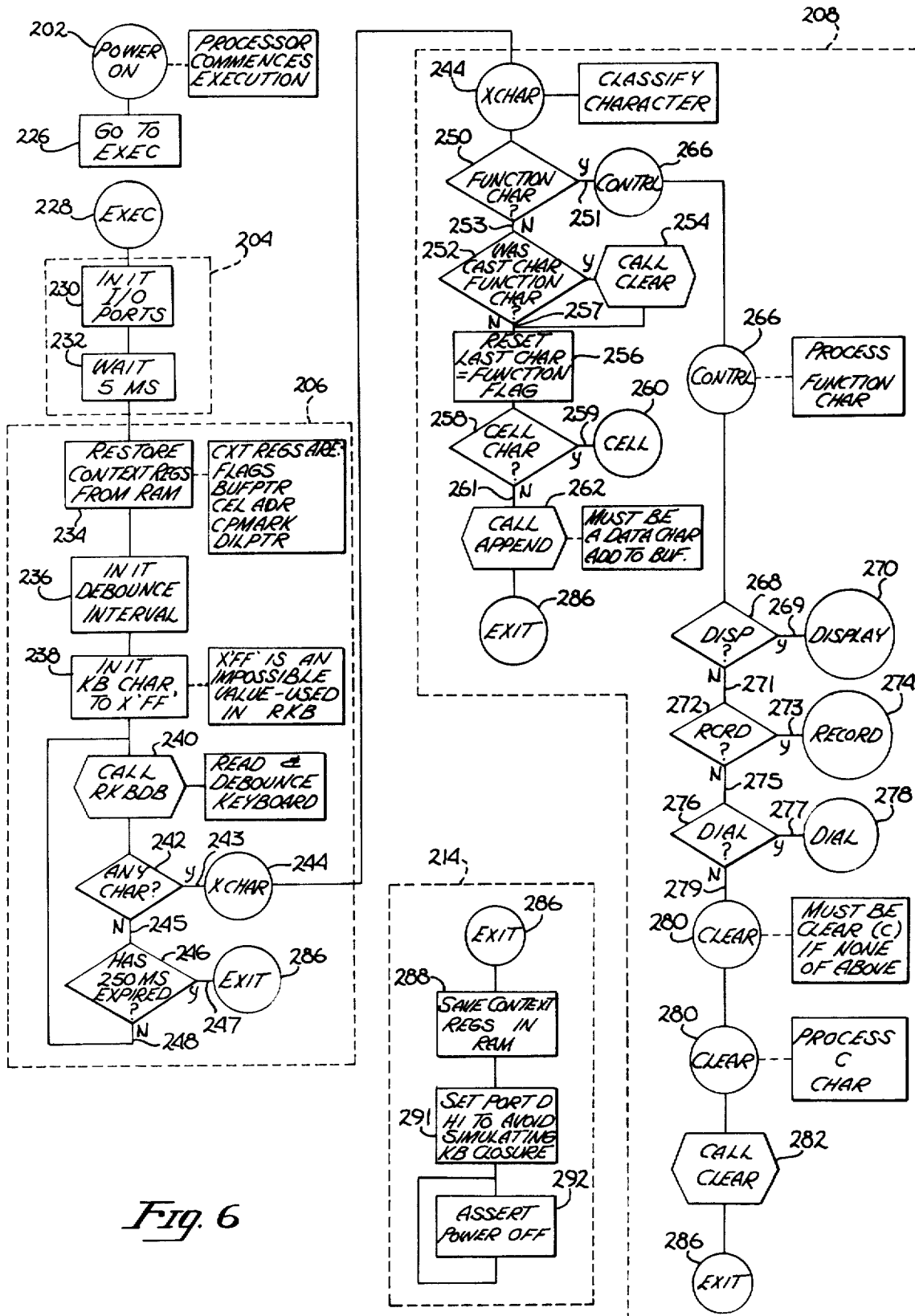
FIG. 6 is a flow diagram of the "MAIN PROGRAM" of the present invention.

FIG. 6 illustrates in more detail the MAIN PROGRAM contained in microprocessor 20. Initial power on at 202 is immediately followed by block 226, a programing instruction to go to the EXECUTIVE program at 228. The wait for a stable system, described as block 204 in FIG. 5, is comprised of blocks 230 and 232. Here, the program in microprocessor 20 initializes all of its input-output control lines to their appropriate states, and enters a five milisecond timing loop to await release of the write inhibit signal to the RAM 24.

The program next enters into the processing steps which comprise the KEYSTROKE CAPTURE routine, illustrated as block 206 in FIG. 5. As shown in block 234, the program loads its internal RAM from the external RAM 24. Then, the internal RAM contains all the control information necessary to resume any operation which may have been functionally incomplete at the time power was previously turned off. An example of this control information is the current buffer pointer, which indicates the next available digit in the thirty digit queuing buffer contained within RAM 24. Other information re-stored in this fashion includes the currently active storage cell address (if any), the digit location in the buffer at which the most recently fetched ten digit number commences (if any) and the digit location in the buffer which follows the most recent dial halt digit (if any). The program is now prepared to commence processing the keystroke which caused the power on and processor activation.

Figure 7:
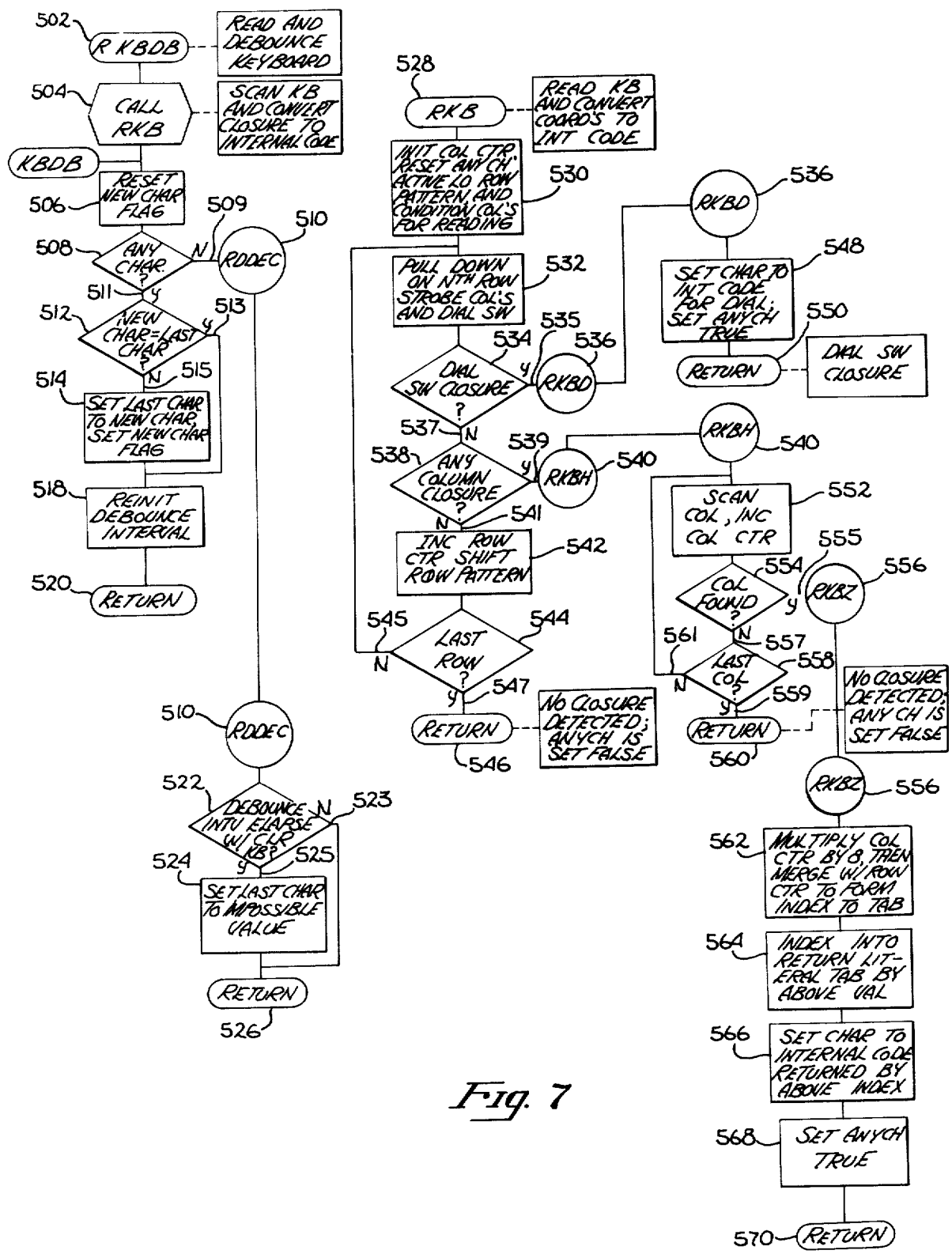
FIG. 7 is a flow diagram of the "KEYSTROKE CAPTURE" subroutine of the present invention.

In block 236 the debounce interval is intialized, and at block 238 the keyboard character is initialized to X'FF', where X'FF' is a value which cannot be generated by the keyboard 6. This initialization of the keyboard character to an impossible value allows the subsequent processing to determine whether a valid keystroke has been actually made. Next, in block 240 the READ and DEBOUNCE subroutine, RKDBD is called. This subroutine RKBDB is illustrated in FIG. 7 and will be described hereinbelow. Following return from subroutine RKBD, a test is made at test block 242 to determine if any character was located during the READ and DEBOUNCE subroutine. If no character was located, exit path 245 is taken to test block 246 where another test is made to determine if 250 milliseconds has expired during the READ and DEBOUNCE subroutine. If this time period has been exceeded, the exit path 247 is taken to the EXIT subroutine via exit connection 286. On the other hand, if the time interval has not been exceeded, exit path 248 is followed so as to loop through the READ and DEBOUNCE subroutine starting at block 240. Assuming a character has been located by the READ and DEBOUNCE subroutine, the exit path 243 is taken from test block 242.

The classify keystroke processing, illustrated as block 208 in FIG. 5, is performed by subroutine XCHAR following the recognition of a character by test block 242. First a test is made at block 250 to determine if the character previously located is a function character. Assuming for the moment that a function character was not located, exit path 253 is taken from test block 250 so that another test may be made at block 252. Here, a test is made to determine whether the character located during the processing immediately preceding the current character processing was a function character. If that previous character was a function character and, as stated, the current character is not a function character, the exit path 255 is taken whereby the CLEAR subroutine is called by block 254. The CLEAR subroutine will be described in detail hereinbelow. Upon return from the CLEAR subroutine, the program proceeds to block 256. If the last character was not a function character, then exit path 257 would have been taken from test block 252 to block 256 where the last character-was-a-function-character control flag is reset to an off condition.

In test block 258 a test is made to determine if the character is a cell character. If the character was a cell character, the exit path 259 is taken to the CELL processing subroutine which is more fully described hereinbelow. If the character was not a cell character, then exit 261 is taken to block 262 where subroutine APPEND is called. Subroutine APPEND, which is also more fully described hereinbelow, will process the data characters so as to add the data to the RAM 24 queuing buffer. Note that it is concluded that since there was no function character found at test block 250 and no cell character was found at test block 258, the character must be a data character. Upon the return from subroutine APPEND, the program exits at 286 to the POWER OFF subroutine, illustrated as block 214 in FIG. 5.

A flow diagram of the POWER OFF subroutine is also shown in FIG. 6. This subroutine is called at each point throughout the processing of microprocessor 20 when a subroutine encounters an exit instruction. In the POWER OFF subroutine 214, the current registers in the microprocessor 20 are saved in the external RAM 24 by block 288. Next, block 291 illustrates that the subroutine sets the I/O lines of microprocessor 20, which are common with the keyboard lines 46, high to avoid simulating a keyboard closure. Finally, the power off sequence is executed as illustrated by block 292.

Now assuming that a function character was found by test block 250, the exit path 251 will be taken so that the function character can be processed by CONTRL subroutine 266. At block 268 a test is made to determine if the character is a display function character. If it is, exit path 269 is taken so as to connect to DISPLAY subroutine 270 for processing of the display function character. If the character is not a display function character, exit path 271 is taken from test block 268 to test block 272, where a test is made to determine if the character is a record function character. If it is a record function character, exit path 273 is taken so as to connect to RECORD subroutine 274 for processing of the record function character. On the other hand if the function character is not a record character, exit path 275 is taken from test block 272 to the test block 276.

In test block 276 a test is made to determine if the function character is a dial function character. If it is a dial character, exit path 277 is taken so as to connect to the DIAL subroutine 278. If, however, the control character is not a dial character, exit path 279 is taken so as to connect to the CLEAR processing 280. Note that the conclusion is that a function character which is neither a display, record, nor dial function character must be a clear function character. The CLEAR processing 280 calls the CLEAR subroutine at block 282 and upon return exits via EXIT subroutine 286.

As noted hereinabove, READ and DEBOUNCE subroutine RKBDB is called by block 240 in FIG. 6. Now referring to FIG. 7 the flow diagram of the READ and DEBOUNCE subroutines is illustrated in detail. The first functional step of READ and DEBOUNCE subroutine 502 is to call subroutine RKB via block 504 to scan the keyboard 6 and convert any key closures found to an internal code. The first step in subroutine RKB is block 530 where various initializations are performed so as to prepare for keystroke detection. Next, in block 532 the nth row of keyboard 6 is activated and all columns of keyboard 6 are strobed so as to locate a continuity. In addition, the dial switch 18 is also strobed. A test is then made at block 534 to determine if there had been a dial switch closure. If a dial switch closure is detected at block 534, the exit path 535 is taken to subroutine RKBD.

In subroutine RKBD, the first step at block 548 is to set the character flag to an internal code corresponding to the dial closure, and to set the ANYCH flag to a true condition. The subroutine then proceeds to return to the RKB subroutine by block 550.

If test block 534 determined that there had not been a dial switch closure, exit path 537 would be taken to test block 538. In test block 538 a test is made to determine if there had been any column closure. If there had not been a column closure, exit path 541 would be taken from test block 538 to block 542 where the row counter is incremented and another test would be performed at block 544 to determine if the last row had been scanned. If the last row had been scanned, exit path 547 would be followed to the return route 546 indicating that no closure had been detected. If on the other hand the last row had not been scanned, exit path 545 would be followed so that the processing of subroutine RKB will be repeated commencing at block 532. In this manner, each row of the keyboard 6 will be activated individually so that the columns of keyboard 6 can be scanned until either all the rows have been activated, or a closure is located.

Now assuming that a column closure had been located at test block 538, exit path 539 would be followed so as to connect to subroutine RKBH. Note that a column closure indicated by test block 538 indicates that one of the five columns has been closed, while it does not indicate which of the columns has been closed.

The first step of subroutine RKBH is to scan each column individually, by block 552. Following the scan of one column, the column counter is incremented by one. A test is then made by test block 554 to determine if a column was found. If no column was found, exit path 557 is followed to test block 558 where another test is made to determine if the last column of keyboard 6 had been scanned. If the last column had been scanned, exit path 559 is taken to return to program RKB. If on the other hand the last column had not been scanned, exit 561 is taken to return to the processing of the program RKBH, starting at block 552, so as to scan the next column. This process of column scanning and column counter incrementing is repeated until all of the columns of keyboard 6 are scanned one at a time.

Now assuming that a column has been found at test block 554, exit path 555 is taken to subroutine RKB2. The purpose of subroutine RKB2 is to convert the coordinates of the closed key to an internal eight bit code which is composed for convenience of subsequent processing. The first step is subroutine RKB2 is block 562 where the column counter is mutiplied by eight, then the result is merged with the row counter to form an index. As indicated by block 564, the index value developed in block 562 is used to enter into a return literal table. This table comprises unique internal codes which correspond to each possible index value. In block 566 the internal code associated with the index value determined from the return literal table is located. Next, in block 568 the ANYCH flag is set to a true condition indicating that a character has been located. Finally, at block 570 the subroutine RKB2 returns to subroutine RKBH.

Upon the return from subroutine RKB to subroutine RKBDB the new character flag is reset at block 506. At test block 508 a test is made to determine if any new character was located by subroutine RKB. If no new character was located, exit path 509 is followed to subroutine RDDEC.

At test block 522 of subroutine RDDEC a test is performed to determine if the debounce interval has elapsed with keyboard 6 being clear (i.e., without a key of keyboard 6 being depressed). If there has been a clear keyboard throughout the debounce interval, exit path 525 is followed to block 524 where the last character flag is set to an impossible value, and the subroutine returns via block 526 to program RKDBD. If on the other hand, the debounce interval has not elapsed with a clear keyboard, exit path 523 is taken to return block 526.

If it is determined in test block 508 that a new character has been located, exit path 511 is followed to test block 512. In test block 512 the new character is compared with the character determined in the preceeding processing. If the new character is the same as the last character, exit path 513 is followed to block 518 where the debounce interval is reinitiated and the subroutine returns via block 520 to the MAIN PROGRAM. If on the other hand, the new character is not the same as the last character, exit path 515 is followed to block 514 where the last character flag is set to the true condition and the last character register is set to the new character. Following block 514, the debounce interval is reinitiated at block 518 and the subroutine returns via block 520 to the MAIN PROGRAM.

It is important to note that if in block 512 it is found that the new character is the same as the character found in the previous processing, the new character flag is not set at block 514, nor is the last character set to the new character determined in the subroutine RKB. This will prevent duplicate processing of the same character, the same character having occured due to continuous entry of the same character by the operator or due to bouncing of the key switch.

As noted in the description of FIG. 6 hereinabove, exit path 269 from test block 268 illustrated in FIG. 6 connects to the DISPLAY subroutines 270. Now referring to FIG. 8, the DISPLAY subroutines 270 are described in detail. First, in block 290 the "END NUM" flag and the display pointer are initialized. Following block 290, a test is made at test block 292 to determine if the beginning of a telephone number has been located. If the beginning of a telephone number has been encountered, exit path 293 is taken from test block 292 to DISPLAY subroutine DISTN.

In DISPLAY subroutine DISTN, the display counter is set to three digits at block 302, then the subroutine DISTR is called to display the telephone number at the display means 4 of terminal 2. Following return from DISPLAY subroutine DISTR, the display counter is set to seven digits at block 306 and the program is returned to block 298 of the DISPLAY subroutine DISP.

If on the other hand, it is determined at test block 292 that the beginning of the telephone number has not been encountered, exit path 295 is taken to block 296. At block 296 the display counter is set to nine digits and then at block 298 the DISPLAY subroutine DISTR is called. Upon return from DISPLAY subroutine DISTR a test is made at test block 300 to determine if the END NUM flag has been encountered. If an END NUM flag has been encountered, exit path 303 is followed to block 290 and the processing of subroutine DISP is repeated again. If, however, an END NUM flag was not encountered at test block 300, exit path 301 is taken to test block 292 where a test is again made to determine if the beginning of a telephone number has been encountered.

Figure 8:
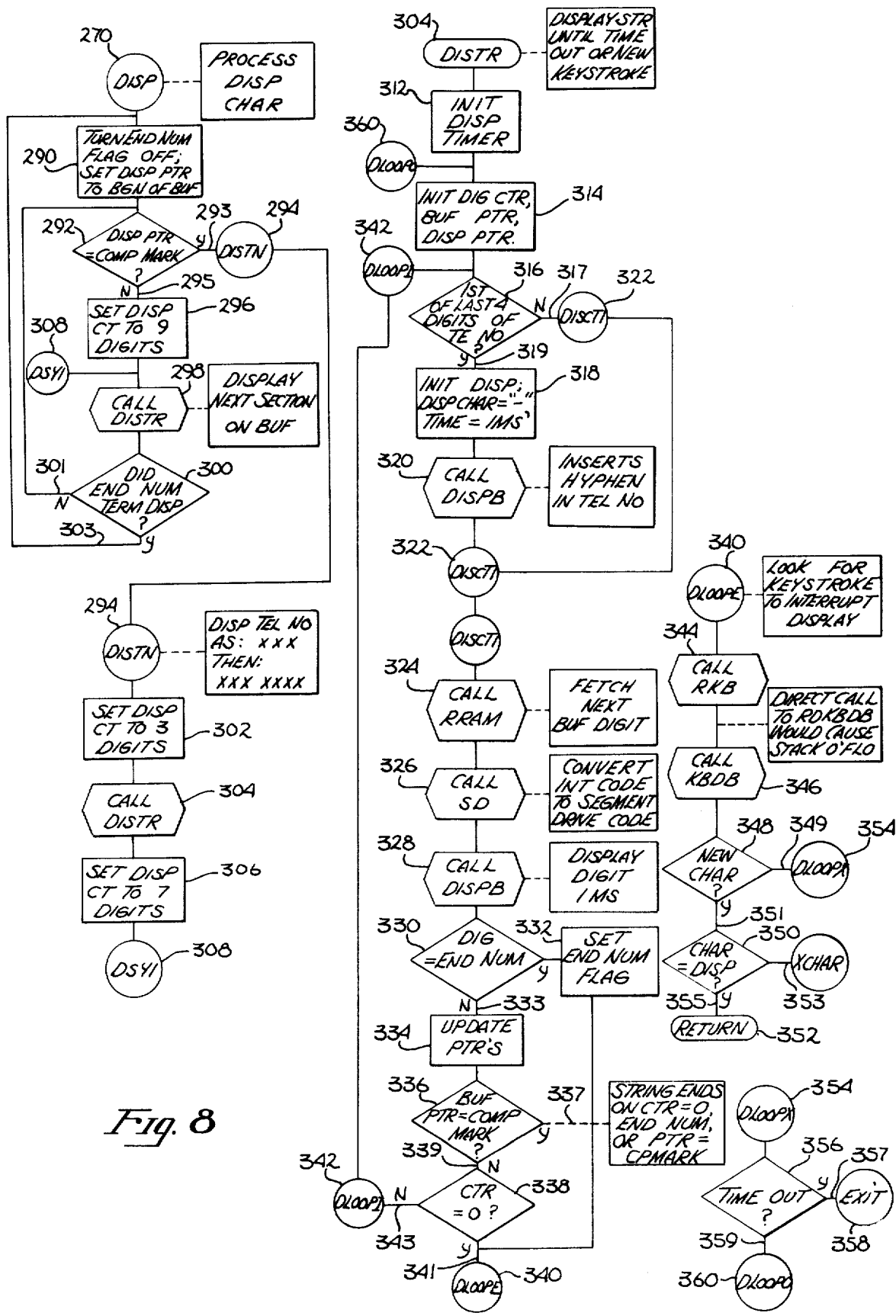
FIG. 8 is a flow diagram of further subroutines of the "KEYSTROKE CAPTURE" subroutines.

DISPLAY subroutine DISTR is also depicted in FIG. 8. In block 312 the display timer is initialized while in block 314 the digital counter, buffer pointer, and display pointers are also initialized. At test block 316 a test is made to determine if the digit being processed is the first digit of the last four digits of the telephone number. If so, exit path 319 is taken to block 318 where the display is initialized so as to display the character "—" for a time period of one millisecond. Next, block 320 calls subroutine DISPB wherein a hyphen character is inserted in the display of the telephone number. Following return from program DISPB, subroutine DISCT1 is initiated. If the test made at test block 316 had been negative, exit path 317 is followed directly to subroutine DISCT1.

The first step in subroutine DISCT1 is to call subroutine RRAM at block 324 where the next digit is brought from the RAM 24 queuing buffer. Then, at block 326 subroutine SD is called so as to convert the internal digit code to an LED segment drive code for display means 4 of terminal 2. Following return from subroutine SD at block 328 subroutine DISPB is called to display the digit for one millisecond. At test block 330 a test is made to determine if the digit just displayed was the last digit of the number being processed. If it was, exit path 331 is followed to block 332 where the END NUM flag is set and then the DLOOPE subroutine is executed.

If it is found at test block 330 that the end number was not just processed, exit path 333 is taken to block 334 where all of the pointers are updated. A test is then made at test block 336 to determine if the buffer pointer now points to the completion mark. If it does, exit path 337 is taken directly to DLOOPE 340. If the buffer pointer does not equal the completion mark, exit path 339 is taken to test block 338. Here a test is made to see if the counter now equals zero. If the digit counter now does equal zero, exit path 341 is followed to DLOPE. If, however, the digit counter does not equal zero, exit path 343 is taken to DLOOPI so that the processing of subroutine DISTR can be repeated starting a block 316.

Also shown in FIG. 8 is subroutine DLOOPE whose first step is to call subroutine RKB at block 344. Following block 344 subroutine KBDB is called at block 346. Following return from subroutine KBDB, a test is made at test block 348 to determine if a new character has been located. If a new character has not been located, exit path 349 is taken to DLOOPX where a test at block 356 is made to see if the time for display has elapsed. If the time for display has elapsed, exit path 357 is taken so as to exit the subroutine.

If on the other hand, the time for display has not elapsed, exit path 359 is taken from test block 356 so as to connect to DLOOP0 so that subroutine DISTR can be repeated starting at block 314. If on the other hand, a new character was located at test block 348, exit path 351 is taken to test block 350 where a test is made to determine if the newly found character is a display character. If the new character is a display character exit path 355 is taken to return at block 352. If the character now located is not a display character, exit path 353 is taken to subroutine XCHAR in the MAIN PROGRAM.

Figure 9:
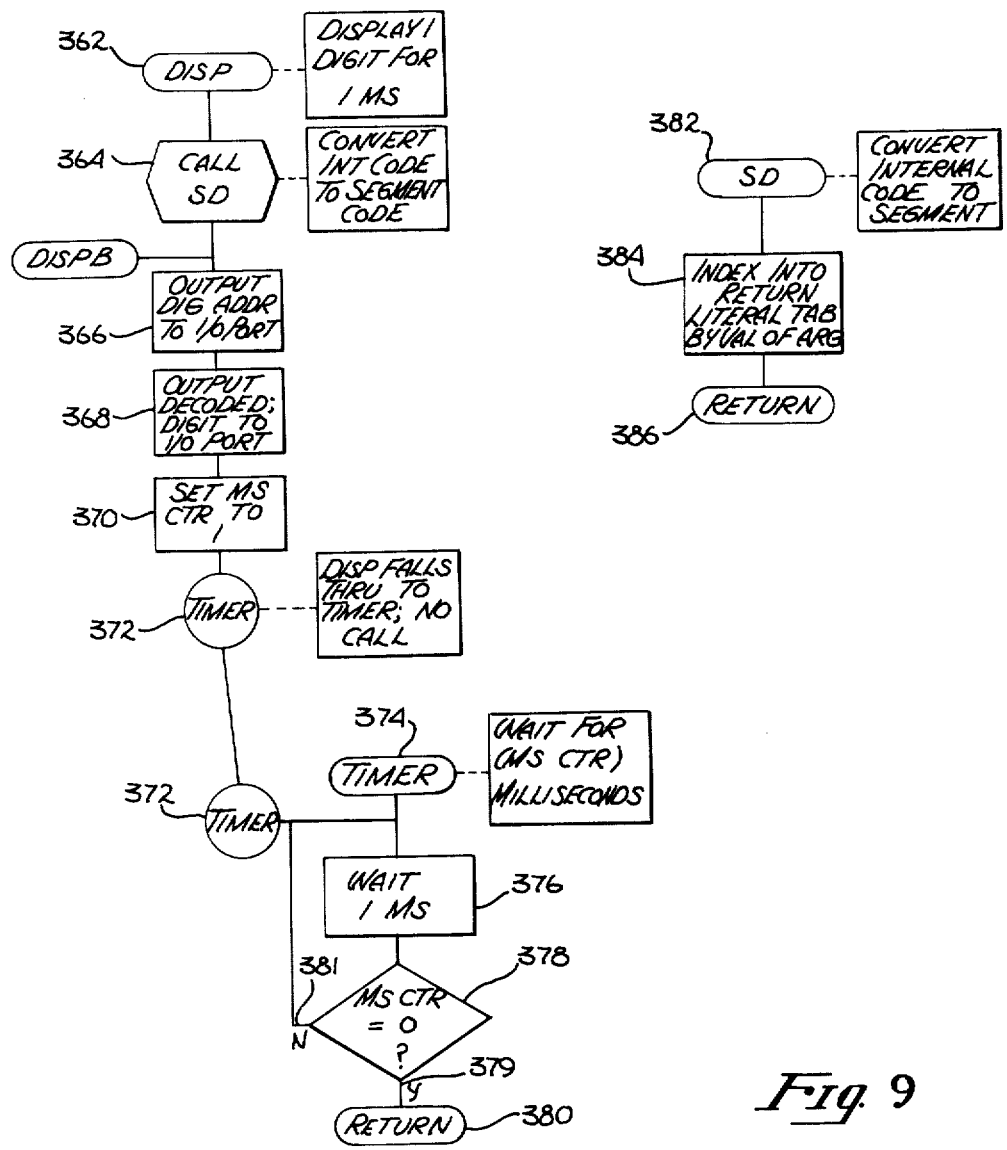
FIG. 9 is a flow diagram of the "DISPLAY" subroutines of the present invention.

The other DISPLAY subroutines are illustrated in FIG. 9. The DISP subroutine 362 first calls subroutine SD at block 364. Upon the return from subroutine SD to subroutine DISP, the output digit address is provided to the I/O port of microprocessor 20 at block 366. Then, at block 368 the decoded output digit is provided to to I/O port for I/O interface. At block 370 the MS counter in microprocessor 20 is set to 1. At block 376 the TIMER subroutine waits one millisecond. A test is then made at test block 378 to determine if the MS counter has been set to zero. If the MS counter was set to zero, exit path 379 is taken from test block 378 so as to return via block 380. If the MS counter was not set to zero, exit path 381 is taken so as to loop back to block 376 again.

Also illustrated in FIG. 9 is subroutine SD. As shown in block 384, subroutine SD indexes into the return literal table by the value of the argument passed to it so as to convert the internal code of the digit being processed to the appropriate segments for the LED display 4.

It can be seen from the DISPLAY subroutines illustrated in FIGS. 8 and 9, that the contents of the RAM 24 queuing buffer are processed so as to be displayed on the LED display 4. The contents of the buffer are displayed nine digits at a time until the buffer pointer equals the ten digit telephone number origin pointer. At this point the next three digits of the buffer are displayed alone, left adjusted in the nine digit display. The remaining seven digits are then displayed with a hyphen inserted between the three digit prefix and the four digit suffix. Displaying then resumes nine digits at a time until all related digits have been displayed, that is, until either the end of the buffer or an END NUM character is encountered. In all cases, the digits are displayed approximately six hundred milliseconds each. Thus, a nine digit section is displayed approximately 5.4 seconds, and the DISP key must be pressed before this period expires in order to view the next portion of the buffer (if any). Otherwise, subsequent display activity will commence from the buffer origin.

In case the display period is allowed to expire without the processor 20 detecting a DISP key closure, the processor 20 proceeds to power off processing. Otherwise, the display function continues as described herein. This continuation of display is implemented as follows. Display of a digit stream utilizes conventional multiplexing techniques, that is, only one digit is actually illuminated at a point in time for a period of approximately one millisecond. Hence a single cycle for a nine digit string lasts approximately nine milliseconds. At the end of each of these cycles the keyboard is scanned for any key closure. If a DISP key stroke is encountered, the processor proceeds as described hereinabove. If any other closure is detected, the processor 20 proceeds as if a fresh keystroke had occured, except the power on sequence is omitted since power off has not occured. If no key closure is detected, the processor 20 continues to cycle or proceeds to power off processing if the display period has expired.

It is important to note that the DISPLAY subroutines provide the important feature of convenient format presentation, that is, the presentation of the telephone number in a format equivalent to the manner in which ten digit telephone numbers are normally written. This is extremely important from a human factors point of view, facilitating visual validation in a natural fashion, as opposed to requiring the user to manually extract the area code or telephone number from an unformatted sequence.

Figure 10:
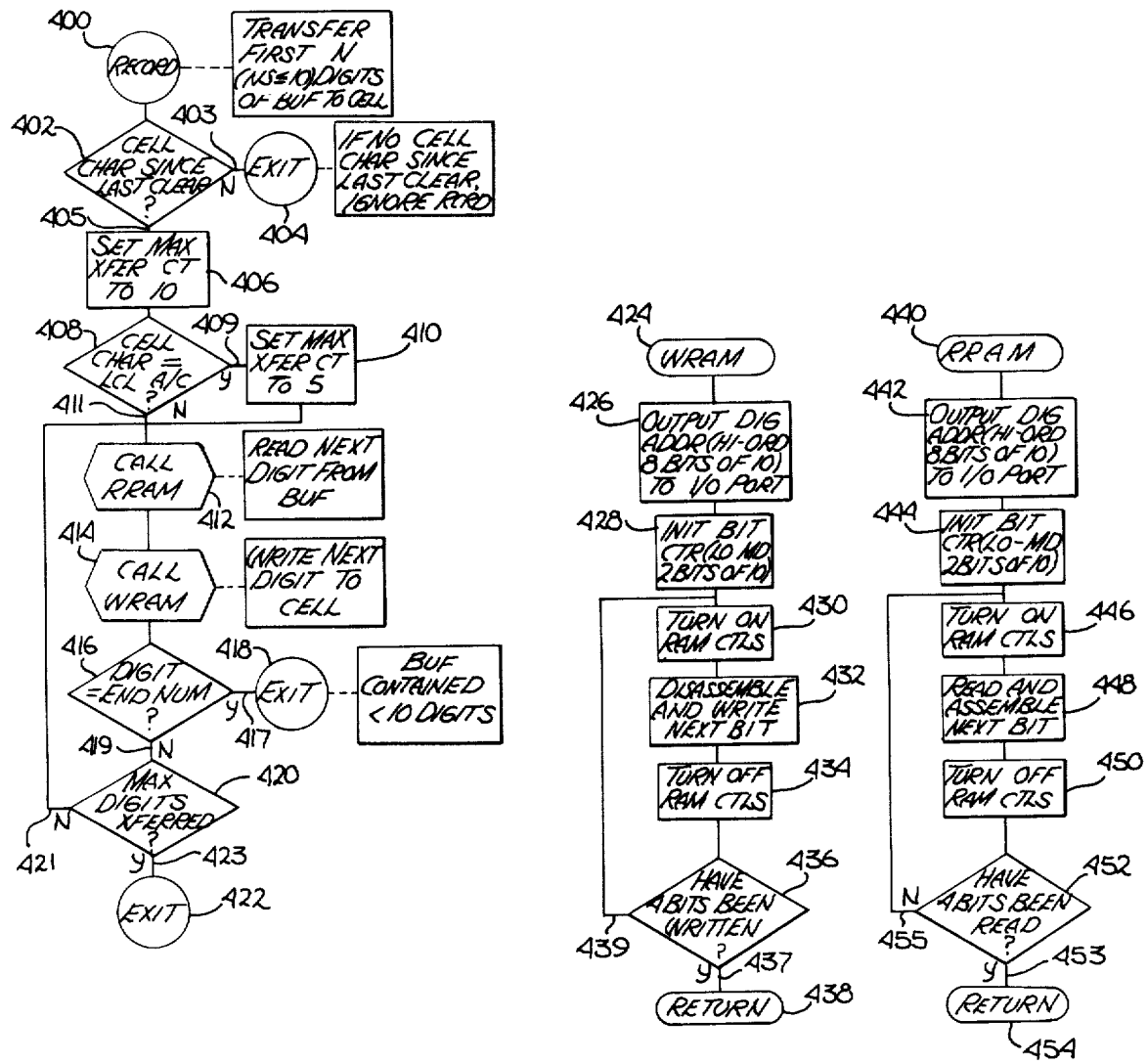
FIG 10 is a flow diagram of the "RECORD" subroutines of the present invention.

In FIG. 10 the RECORD subroutines are described. First, in test block 402 a test is made to determine if a cell character has been entered prior to the last clear processing. If the result at test block 402 is negative, exit path 403 is taken so as to exit via exit 404 from the subroutine. On the other hand, if the test at test block 402 is positive, exit path 405 is taken to block 406 where the maximum transfer counter is set to ten. Next, a test is made at test block 408 to determine if the previously input cell character was a local area code cell. If the cell character was a local area code, exit path 409 is taken to block 410 where the maximum transfer counter is set to five, and the subroutine reconnects at block 412. However, if the cell character is not equal to the local area code, exit path 411 is taken to block 412 where the subroutine RRAM is called. Upon return from subroutine RRAM, subroutine WRAM is called by block 414. As will be described hereinbelow, subroutines RRAM and WRAM will first read the next digit from RAM 24 queuing buffer and then write that digit to the cell previously selected.

Upon return from subroutine WRAM, a test is made at test block 416 to determine if the digit just written to the cell was the last digit in the number. If it was, exit path 417 is taken so as to exit from the subroutine via exit 418. If the digit was not the last digit, exit path 419 is taken to test block 420 where a test is made to determine if the maximum number of digits have been transfered. If they have, exit path 423 is taken so as to exit from the subroutine via exit 422. On the other hand, if the maximum number of digits has not been transfered, exit path 421 is taken so as to loop through a portion of the RECORD subroutine starting at block 412. In this manner blocks 412, 414, 416, and 420 will be repeated until either the maximum number of digits is transfered to the cell or the last digit is encountered.

Subroutine RRAM is also illustrated in FIG. 10. In block 442 the digit address is located and placed into the I/O port of microprocessor 20. In block 444 the bit counter is intialized. Next, in block 446 the RAM controls are turned on. Then, in block 448 the digit is read and the next bit is assembled. In block 450 the RAM controls are turned off, and in block 452 a test is made to determine if four bits have been read from the queuing buffer of RAM 24. If not, exit path 455 is taken so as to loop through a portion of subroutine RRAM starting at block 446. This loop is repeated until four bits have been read from the buffer. When four bits have read from the buffer, exit path 453 is taken so as to return to subroutine RECORD via return 454.

Also illustrated in FIG. 10 is subroutine WRAM. The first step in subroutine WRAM is block 426 where the digit address is located and provided to the I/O port. Next, in block 428 the bit counter is initialized. Then, at block 430 the RAM controls are turned on. At block 432 the next bit is written to the RAM. At block 434 the RAM controls are turned off, and at block 436 a test is made to determine if four bits have been written to the cell. If they have, exit path 437 is taken so as to return to the subroutine RECORD via return 438. If four bits have not been written to the cell, exit path 439 is taken so as to loop through a portion of subroutine WRAM starting at block 430. This looping will continue until all four bits have been written to the cell.

It can be seen from the above description, that the RECORD subroutines cause digits from the RAM 24 queuing buffer, beginning at the buffer origin, to be copied into the most recently accessed storage cell (i.e, the cell whose beginning address is contained in the current cell pointer) until either ten digits are copied or until an END NUM character is encountered. If no cell had been accessed since the last clear operation, the RECORD keystroke is ignored. This implementation of RECORD subroutines in the present invention results in several novel and useful benefits, including the ability to copy the contents of one cell to another with the following keystroke sequence: cell of origin, cell of destination, RECORD. Thus, using only a single cell as temporary storage, the contents of all remaining cells maybe rearranged arbitrarily. For example, as it becomes clear one or more numbers are accessed more frequently than other numbers, it may be desirable to move the frequently accessed numbers into more convenient keyboard locations.

Figure 11:
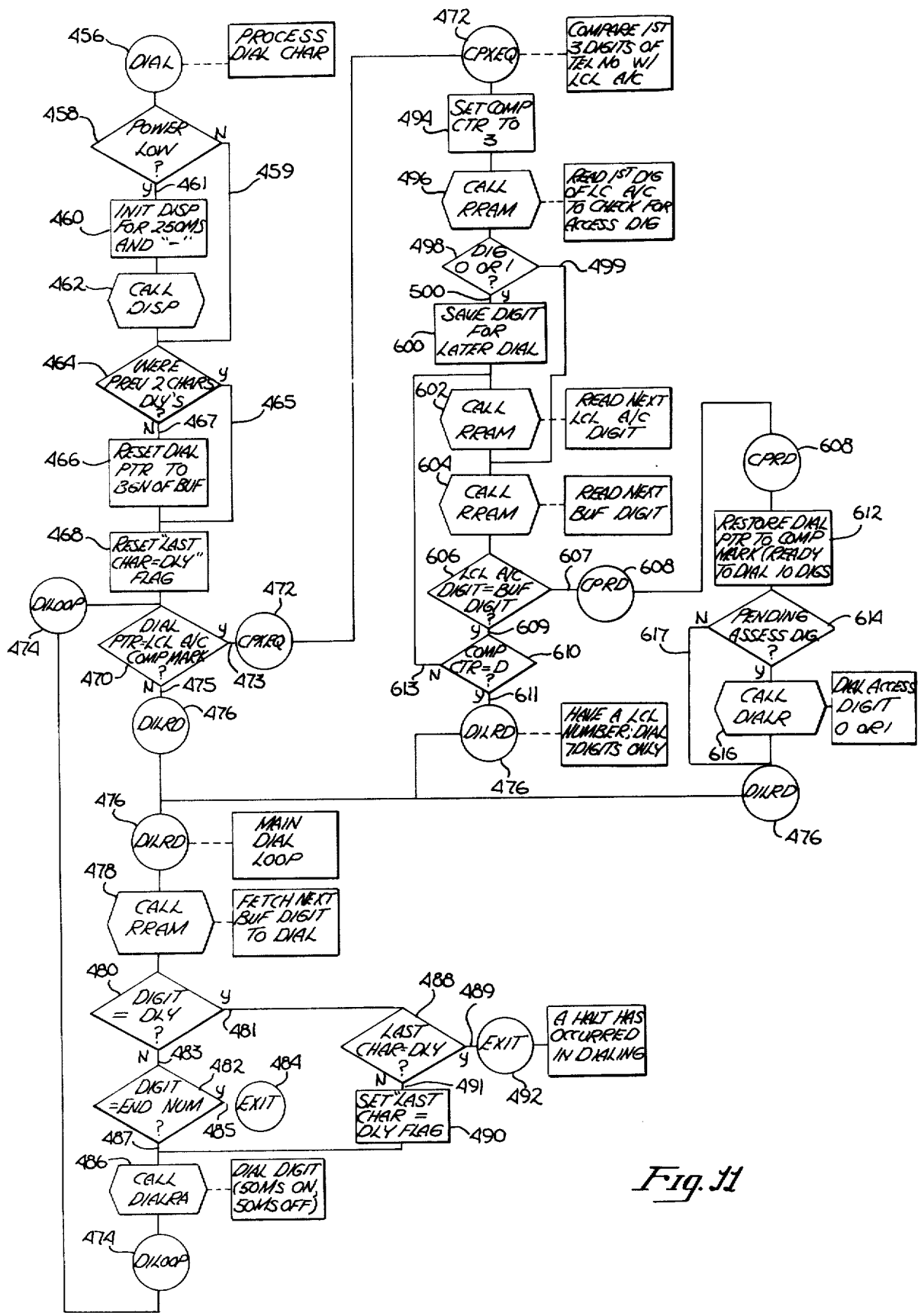
FIG. 11 is a flow diagram of the "DIAL" subroutines of the present invention.

FIG. 11 illustrates the DIAL subroutines. The DIAL PROCESS subroutine 456 begins with test block 458 where a test is made to determine if the power supplied to the microprocessor 20 is greater than some necessary voltage. If the power is low, exit path 461 is taken to block 460 where the display is initialized to display a hyphen for two hundred fifty milliseconds. Next, at block 462 the DISP subroutine is called so as to display the hyphen for two hundred fifty milliseconds. If on the other hand, the power is found to be adequate at test block 458, exit path 459 is taken to test block 464 where a test is made to determine if the prior two characters which had been processed were delay characters. If they were not delay characters, exit path 467 is taken to block 466 where the dial pointer is reset to the beginning of the buffer. If on the other hand the prior two characters were delay characters, exit path 465 is taken to block 468 where the last character flag is set to signify a delay character. Next, a test is made at block 470 to determine if the dial pointer indicates that a local area code is to be processed. If a local area code is to processed, exit path 473 is taken to subroutine CPXEQ which will be described hereinbelow. If not, exit path 475 is taken to subroutine DILRD.

In subroutine DILRD, the main dial loop, the next buffer digit is to be dialed is fetched from the queuing buffer of RAM 24 by calling subroutine RRAM at block 478. Upon return from subroutine RRAM, a test is made at test block 480 to determine if the digit just fetched is a delay digit. If it is not, exit path 483 is taken to test block 482 where another test is made to determine if the digit just fetched is the last digit of the number. If it is, exit path 485 is taken so as to exit from the subroutine via exit 484. If it is not, exit path 487 is taken to block 486 where the subroutine DIALRA is called so as to dial the digit. Upon return from subroutine DIALRA, the subroutine loops back to perform the test at test block 470 via loop DILOOP 474. If on the other hand, if is found in test block 480 that the digit just fetched is a delay digit, exit path 481 is taken from test block 480 so that another test can be made at block 488 to determine if the last character flag indicates a delay character. If it does, exit path 489 is taken so as to exit from the subroutine via 492, thus resulting in a halt in dialing. If it is found at test block 488 that the last character was not a delay character, the exit path 491 is taken to block 490 where the last character flag is set to indicate a delay character. Then the subroutine returns to the DILRD subroutine at block 486.

If it is determined at test block 470 that the dial pointer is indicating that a local area code has been encountered, exit path 473 is taken to subroutine CPXEQ. The first step in subroutine CPXEQ is to set the comparator counter to three, at block 494. Then, at block 496 subroutine RRAM is called so as to read the first digit of the local area code. Upon return from subroutine RRAM, a test is made at block 498 to determine if the digit just fetched is a zero or a one, i.e., an access digit. If the digit is a zero or a one, exit path 500 is taken to block 600 where the digit is saved for later dialing.

If on the other hand, the digit tested at block 498 was not a zero or one, exit path 499 is taken to block 604, where subroutine RRAM is called again to read the next buffer digit. Upon return from subroutine RRAM, another test is made at test block 606 to determine if the local area code digit is the same as the buffer digit. If it is, exit path 609 is taken to test block 610 where a test is made to determine if the comparator counter is now equal to zero. If it is not, exit path 613 is taken so as to loop through a portion of the subroutine CPXEQ starting at block 602. If, however, the comparator counter is equal to zero, exit path 611 is taken so as to return to subroutine DILRD. In this manner a portion of subroutine CPEXQ is looped through so that the first three digits of the telephone number (i.e. the area code) which is to be dialed is compared with the local area code stored in terminal 2. Identity between the area code of the number to be dialed and the stored area code indicates that the desired number is a local telephone number. When this identity is found, exit path 611 from test block 610 is followed to the main dial loop (subroutine DILRD). Since the buffer pointer is now at the fourth digit of the number to be dialed, the area code will be excluded from dialing, and only the last seven digits will be dialed.

If it is found at test block 606 that a local area code digit is not equal to a buffer digit, thus indicating that the telephone number to be dialed is not a local number, exit path 607 is taken to subroutine CPRD. Then, at block 612 the dial pointer is restored to the comparator mark, i.e., the beginning of the number to be dialed. Next, a test is made at test block 614 to determine if an access digit is pending. If it is, subroutine DIALR is called at block 616 and upon its return, the subroutine returns to the main dial loop subroutine, DILRD. If it is not, exit path 617 is taken directly to subroutine DILRD.

Figure 12:
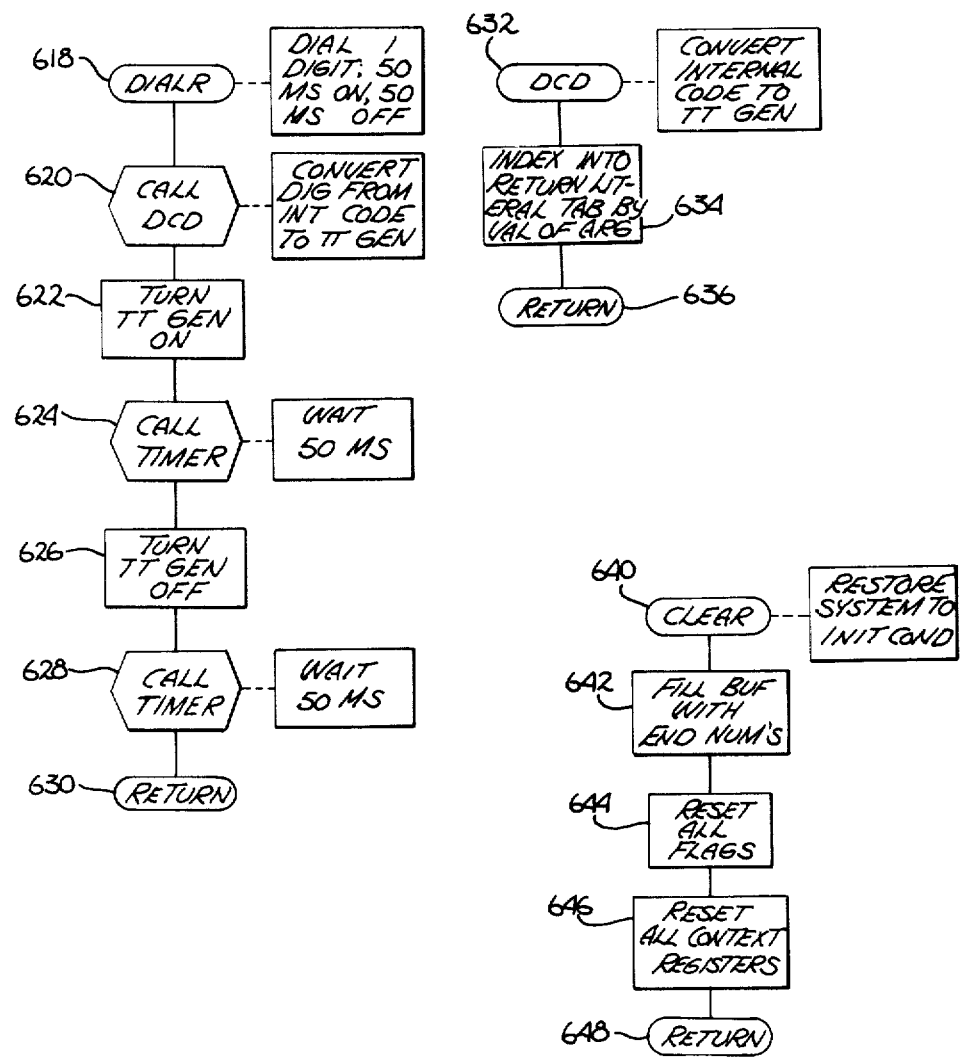
FIG. 12 is a flow diagram of further subroutines of the "DIAL" subroutines of the present invention.

FIG. 12 illustrates the DIALR subroutine called by the subroutines illustrated in FIG. 11. First, subroutine DCD is called at block 620 so as to convert the digit from the internal code to the tone generator code. Next, at block 622 the tone generator 26 is turned on. At block 624 the TIMER subroutine is called for a duration of fifty milliseconds. Then, at block 626 the tone generator 26 is turned off. At block 628 the TIMER subroutine is again called for fifty milliseconds, and upon return from the TIMER subroutine, the DIALR subroutine returns via block 630.

Also illustrated in FIG. 12 is subroutine DCD which is used to convert the internal code of the digit to the tone generator code. The first step in subroutine DCD is block 634 where the subroutine indexes into the return literal table by the value of the argument passed to it from the calling program. Upon determining the corresponding code of the argument in the table, subroutine DCD returns to the calling program via block 636.

Further illustrated in FIG. 12 is the subroutine CLEAR which is used to restore the system to its initial conditions. First, at block 642 the buffer is filled with END NUM characters. Next, at block 644 all flages are reset. Then, at block 646 all context registers are reset. Finally, the CLEAR subroutine returns via block 648.

It can be seen from the above description that the DIAL subroutines cause the contents of the RAM 24 queuing buffer, beginning with the buffer origin, to be converted one digit at a time to one of the twelve tone pairs or a null tone, which is generated at the speaker 14 for a period of fifty milliseconds, followed by fifty milliseconds of silence. Prior to this activity, for each digit, the current buffer pointer is compared to the current ten digit telephone number origin pointer. If they are not equal, the dial activity proceeds until either the end of the buffer is encountered or an END NUM (termination digit) is encountered, or a halt digit is encountered. In case a halt digit is encountered, the current dial pointer is set to the location of the next buffer digit so that the dial activity may resume correctly if the the next keystroke is a DIAL.

If, on the other hand, the current buffer pointer is equal to the current ten digit telephone number origin pointer the following occurs. The processor 20 examines the first digit of the three or four digits stored in the local area code cell. If it is a one or a zero, the processor 20 retains this information in a temporary register and then compares the next three digits of the local area code with the next three digits in the buffer, which contain the area code portion of the current ten digit telephone number. If these two sets of three digits are equal the processor 20 continues to dial one digit at a time as described above, beginning with the fourth digit of the ten digit number. Thus, the ten digit number is identified as a local number, and the area code must not be dialed. If the two sets of three digits are unequal, then the processor 20 examines the one or zero temporary register, dials the one or zero or nothing depending upon the contents of the temporary register and then resumes dialing one digit at a time as described above, beginning with the first digit of the ten digit number. Thus, the ten digit number is identified as a long distance number, and the one or zero or nothing and the area code must be dialed as well as the following seven digits.

Figure 13:
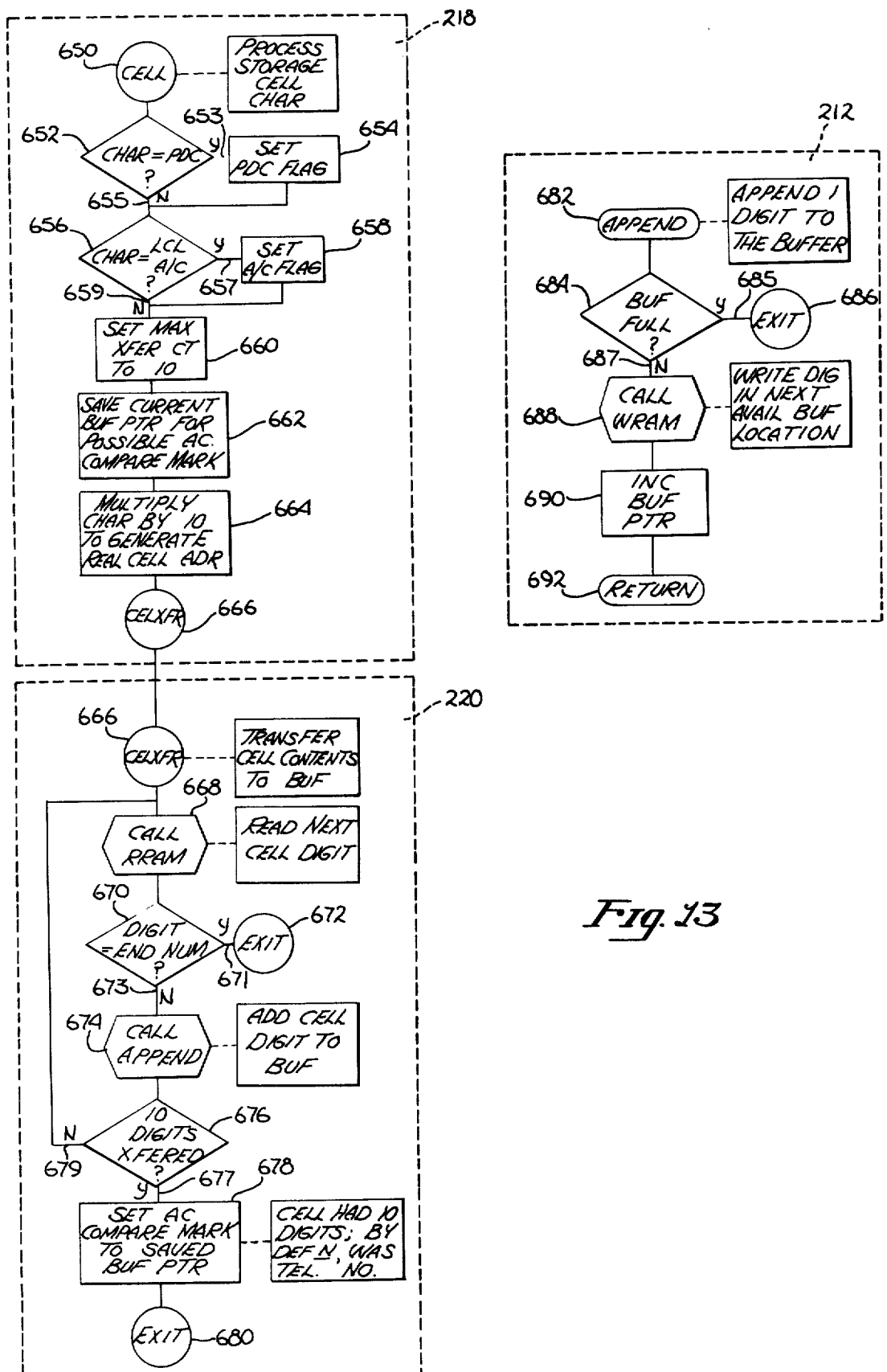
FIG. 13 is a flow diagram of the "CELL" subroutines of the present invention.

FIG. 13 illustrates the operation of the CELL subroutines. Subroutine CELL is used to process the storage cell character upon depression of the various cell keys. Initially, a test is made at test block 652 to determine if the character corresponding to the key that was depressed is a predial code (pdc). If the character previously depressed was a pdc character, exit path 653 is taken to block 654 where the pdc flag is set positive. If the character was not a pdc character, exit path 655 is taken to test block 656 where another test is performed to determine if the character corresponds to the local area code character. If this test is found to be affirmative, exit path 657 is followed to block 658 where the area code flag is set affirmative. If on the other hand, the character is not a local area code, exit path 659 is taken from test block 656 to block 660 where the maximum transfer count is set to ten.

At block 662 the current buffer pointer is saved for possible later use. Then, at block 664 the storage selection code corresponding to the character is multiplied by ten to generate the real cell address. Then, at block 666, subroutine CELXFR is called.

Subroutine CELXFR is used to transfer the contents of the cell selected to the RAM 24 queuing buffer. First, at block 668 the subroutine RRAM, which has been previously described, is called to read the next digit contained in the cell. In test block 670 the digit is tested to determine whether it corresponds to the END NUM character. If it does, exit path 671 is taken so that the subroutine exists via exit 672. If on the other hand, the digit does not correspond to the END NUM, exit path 673 is taken to block 674 where the subroutine APPEND is called to add the cell digit to the buffer.

Following return from subroutine APPEND, a test is made at test block 676 to determine if, thus far, ten digits have been transferred to the buffer. If not, the subroutine loops back to subroutine CELXFR at block 668. The previously described sequence is repeated until ten digits have been transferred. When ten digits have been transferred from the cell to the buffer, exit path 677 is taken from test block 676 to block 678. Here, the area code compare mark is set to correspond to the buffer pointer saved at block 662. Note that because ten digits were transferred from the cell to the buffer, it is assumed that the ten digits correspond to a telephone number. Following block 678, the subroutine exits via exit 680.

Also illustrated in FIG. 13 is subroutine APPEND which is used to write one digit from the external RAM 24 to the RAM 24 queuing buffer. The first step in subroutine APPEND is to test the buffer to determine if it is full. If it is, exit path 685 is taken from test block 684 so as to exit via exit 686. If the buffer is not full, exit path 687 is taken to block 688 where subroutine WRAM is called so as to write the digit in the next available buffer location. Then, at block 690 the buffer pointer is incremented and the subroutine returns via return 692.

It can be seen from FIG. 13 that the code corresponding to the actuated cell key is converted to an address for the corresponding number stored in the external, continuously powered RAM 24 by first discarding the high order three code bits and then multiplying the remaining low order five code bits by ten. Using this address as a starting source address and the current buffer pointer as a starting destination address, data are then moved from the cell to the buffer until any of three conditions occur: ten digits are moved, in which case the current telephone number pointer is set to the starting source address; an END NUM (termination digit) is encountered; or the buffer is filled. In all cases, the processor 20 then proceeds to power off processing via the exit.

There has been described herein a new and novel data telecommunications terminal. While a specific embodiment of the present invention has been disclosed and described in detail herein, it will be understood by those skilled in the art that various changes in form and detail may be made therein without departing from the spirit and scope of the invention.

I claim:

1. A data telecommunications terminal for use with a telephone system comprising:
   (i) memory means for semi-permanently storing data;
   (ii) signal generator means for generating signals corresponding to said data;
   (iii) signal coupling means coupled to said signal generator for coupling said signals to said telephone system;
   (iv) a keyboard having a first group of switches for inputting data, a second group of switches for directing the storage of said data, and at least one switch for directing the generation of signals corresponding to said data;
   (v) a microprocessor coupled to said memory means, said signal generator means and said keyboard for controlling, under the direction of said keyboard, the receipt of said data from said keyboard, the storage of said data by said memory means, the generation of said signals by said generator means, and the supply of voltage within said terminal, whereby said data is entered into said memory means from said keyboard and said data is coupled to said telephone system from said memory means, and;
   (vi) self-contained power control means coupled to said memory means, said keyboard and said microprocessor for providing voltage substantially only during actuation of said switches, said power control means activated upon actuation of any one of said switches and automatically deactivated by a command from said microprocessor upon completion of processing by said terminal.

2. The terminal of claim 1 wherein said signal coupling means is an acoustic coupler.

3. The terminal of claim 2 wherein said microprocessor comprises a stored program containing a set of instructions, and control lines for providing commands to said memory means and said signal generator means in accordance with said instructions.

4. The terminal of claim 3 wherein said power control means is comprised of a battery and a control circuit.

5. The terminal of claim 4 further comprising a display means adapted to display said data.

6. The terminal of claim 1 wherein said power control means is comprised of a battery and a control circuit.

7. The terminal of claim 6 further comprising a display means adapted to display said data.

8. The terminal of claim 7 wherein said signal coupling means is an acoustic coupler.

9. The terminal of claim 1 wherein said microprocessor comprises a stored program containing a set of instructions, and control lines for providing commands to said memory means and said signal generator means in accordance with said instructions.

10. The terminal of claim 9 further comprising a display means adapted to display said data.

11. A data telecommunications terminal for use with a telephone system comprising:
    (i) a keyboard comprising a plurality of switches for inputting numbers and directing the storage and transmission of said numbers;
    (ii) a signal generator;
    (iii) memory means for storing a plurality of sequences of said numbers and at least one access number of at least one digit;
    (iv) a microprocessor coupled to said keyboard, said signal generator, and said memory means, said microprocessor comprising a stored program containing a set of instructions, and control lines for providing commands which selectively direct said memory means to store said sequences of numbers and said signal generator to generate dual-frequency signals corresponding to said numbers;
    (v) signal coupling means coupled to said signal generator for acoustically coupling said dual-frequency signals to said telephone system;
    (vi) display means coupled to said microprocessor for displaying said numbers; and
    (vii) self-contained power control means coupled to said memory means, said microprocessor means and said keyboard, said power control means adapted to provide voltage substantialy only during actuation of said switches, whereby upon actuation of one of said switches, instructions in said stored program cause said microprocessor to direct the acoustic coupling of said access number to said telephone system, followed by a time delay prior to acoustically coupling one of said sequences of numbers to said telephone system, and said stored program contains instructions which, upon the sequential actuation of three said switches, causes said microprocessor to direct the transfer of one said sequence of numbers from one location to another location within said memory means.

12. The terminal of claim 11 wherein said memory means comprises a buffer portion adapted to temporarily store said data stored in other portions of said memory means and said data from said keyboard.

13. A data telecommunications terminal for use with a telephone system comprising:
    (i) a keyboard comprising a plurality of switches for inputting numbers and directing the storage and transmission of said numbers;
    (ii) a signal generator;
    (iii) memory means for storing a plurality of sequences of said numbers and at least one access number of at least one digit;
    (iv) a microprocessor coupled to said keyboard, said signal generator, and said memory means, said microprocessor comprising a stored program containing a set of instructions, and control lines for providing commands which selectively direct said memory means to store said sequences of numbers and said signal generator to generate dual-frequency signals corresponding to said numbers;

(v) signal coupling means coupled to said signal generator for acoustically coupling said dual-frequency signals to said telephone system;

(vi) display means coupled to said microprocessor for displaying said numbers; and (vii) self-contained power control means coupled to said memory means, said microprocessor means and said keyboard, said power control means adapted to provide voltage substantialy only during actuation of said switches, whereby upon actuation of one of said switches, instructions in said stored program cause said microprocessor to direct the acoustic coupling of said access number to said telephone system, and inhibits the acoustic coupling of any of said sequences of numbers to said telephone system without further actuation of one of said switches, said stored program further containing instructions which, upon the sequential actuation of three said switches, causes said microprocessor to direct the transfer of one said sequence of numbers from one location to another location within said memory means.

14. The terminal of claim 13 wherein said memory means comprises a buffer portion adapted to temporarily store said data stored in other portions of said memory means and said data from said keyboard.

15. A data telecommunications terminal for use with a telephone system comprising:

(i) a keyboard for inputting data and directing the processing of said data, said keyboard comprising a plurality of switches;

(ii) a signal generator;

(iii) a memory device;

(iv) microprocessing means coupled to said keyboard, said signal generator and said memory device for processing said data, said microprocessing means comprising a stored program containing a set of instructions, and control lines for providing commands, in accordance with said instructions, which selectively direct said memory device to store said data and said signal generator to provide audible tones which correspond to said data;

(v) signal coupling means coupled to said signal generator means for acoustically coupling said tones to said telephone system;

(vi) self-contained power control means coupled to said memory device, said microprocessor means, and said keyboard, said power control means adapted to provide voltage substantially only during actuation of said switches, said power control means further comprising a write inhibit signal coupled to said memory device, said write inhibit signal adapted to deactivate the input/output lines of said memory device for a fixed period of time following actuation of said switches.

16. The terminal of claim 15 further comprising a display device, and wherein said stored program contains instructions which cause said microprocessor to provide commands to said display device whereby said display device displays a first group of digits of said stored data, followed by the display of a character between a second group of digits of said stored data and a third group of digits of said stored data followed by displays of groups of digits until all related digits of said stored data have been displayed.

17. The terminal of claim 16 wherein said stored program contains instructions which cause said microprocessor to compare a first group of digits of said stored data with a second group of digits of said stored data and process said first group of digits in accordance with said comparison.

18. The terminal of claim 17 wherein said signal coupling means is further adapted to directly electrically couple said dual-frequency signals to said telephone system.

19. A data telecommunications terminal for use with a telephone system comprising:

(i) a keyboard for inputting data and directing the processing of said data, said keyboard comprising a plurality of switches;

(ii) a signal generator;

(iii) a memory device;

(iv) microprocessing means coupled to said keyboard, said signal generator and said memory device for processing said data, said microprocessing means comprising a stored program containing a set of instructions, and control lines for providing commands, in accordance with said instructions, which selectively direct said memory device to store said data and said signal generator to provide audible tones which correspond to said data;

(v) signal coupling means coupled to said signal generator means for acoustically coupling said tones to said telephone system; and (vi) a display device, whereby said instructions in said stored program cause said microprocessor to provide commands to said display device thereby causing said display device to display a first group of digits of said stored data, followed by the display of a character between a second group of digits of said stored data and a third group of digits of said stored data, followed by displays of groups of digits until all related digits of said stored data have been displayed.

20. The terminal of claim 19 further comprising a self-contained power control means coupled to said memory device, said microprocessor means and said keyboard, said power control means adapted to provide voltage substantially only during actuation of said switches, and provide a write inhibit signal to said memory device, said write inhibit signal adapted to deactivate the input/output lines of said memory device for a fixed period of time following actuation of said switches.

21. The terminal of claim 20 wherein said stored program contains instructions which cause said microprocessor to compare a first group of digits of said stored data with a second group of digits of said stored data and process said first group of digits in accordance with said comparison.

22. The terminal of claim 21 wherein said signal coupling means is further adapted to directly electrically couple said dual-frequency signals to said telephone system.

23. A data telecommunications terminal for use with a telephone system comprising:

(i) a keyboard for inputting data and directing the processing of said data, said keyboard comprising a plurality of switches;

(ii) a signal generator;

(iii) a memory device;

(iv) microprocessing means coupled to said keyboard, said signal generator and said memory device for processing said data, said microprocessing means comprising a stored program containing a set of instructions, and control lines for providing commands, in accordance with said instructions, which selectively direct said memory device to store said data and said signal generator to provide audible tones which correspond to said data, said stored program containing instructions which cause said microprocessor to compare a first group of digits of said stored data with a second group of digits of said stored data and process said first group of digits in accordance with said comparison; and (v) signal coupling means coupled to said signal generator means for acoustically coupling said tones to said telephone system.

24. The terminal of claim 23 further comprising a self-contained power control means coupled to said memory device, said microprocessor means, and said keyboard, said power control means adapted to provide voltage substantially only during actuation of said switches, and provide a write inhibit signal coupled to said memory device, said write inhibit signal adapted to deactivate the input/output lines of said memory device for a fixed period of time following actuation of said switches.

25. The terminal of claim 24 further comprising a display device, and wherein said stored program contains instructions which cause said microprocessor to provide commands to said display device whereby said display device displays a first group of digits of said stored data, followed by the display of a character between a second group of digits of said stored data and a third group of digits of said stored data, followed by displays of groups of digits until all related digits of said stored data have been displayed.

26. The terminal of claim 25 wherein said signal coupling means is further adapted to directly electrically couple said dual-frequency signals to said telephone system.

27. A data telecommunications terminal for use with a telephone system comprising:
  (i) a keyboard comprising a plurality of switches for inputting numbers and directing the storage and transmission of said numbers;
  (ii) a signal generator;
  (iii) memory means for semi-permanently storing a plurality of sequences of said numbers;
  (iv) a microprocessor coupled to said keyboard, said signal generator, and said memory means, said microprocessor comprising a stored program containing a set of instructions, and control lines for providing commands which selectively direct said memory means to store said sequences of numbers, said signal generator to generate dual-frequency signals corresponding to said numbers, and which selectively control the supply of voltage within said terminal;
  (v) signal coupling means coupled to said signal generator for acoustically coupling said dual-frequency signals to said telephone system;
  (vi) display means coupled to said microprocessor for displaying said numbers; and
  (vii) self-contained power control means coupled to said memory means, said microprocessor means and said keyboard, said power control means adapted to provide voltage substantially only during actuation of said switches, said power control means activated upon actuation of any one of said switches and automatically deactivated by a command from said microprocessor upon completion of processing by said terminal.

28. The terminal of claim 27 wherein said stored program contains instructions which, upon actuation of one of said switches, causes said microprocessor to direct the acoustic coupling of one of said sequences of numbers to said telephone system.

29. The terminal of claim 28 wherein said stored program contains instructions which, upon actuation of one of said switches, causes said microprocessor to direct the acoustic coupling of a portion of one of said sequences of numbers to said telephone system.

30. The terminal of claim 29 wherein said memory means is further adapted to store at least one access number of at least one digit, and wherein said stored program contains instructions which, upon actuation of one of said switches, causes said microprocessor to direct the acoustic coupling of said access number to said telephone system, followed by a time delay prior to acoustically coupling one of said sequences of numbers to said telephone system.

31. The terminal of claim 27 wherein said memory means comprises a buffer portion adapted to temporarily store said data stored in other portions of said memory means and said data from said keyboard.

32. The terminal of claim 31 wherein said stored program contains instructions which, upon actuation of one of said switches, causes said microprocessor to direct the acoustic coupling of one of said sequences of numbers to said telephone system.

33. The terminal of claim 32 wherein said memory means is further adapted to store at least one access number of at least one digit.

34. The terminal of claim 27 wherein said memory means is further adapted to store at least one access number of at least one digit.

35. The terminal of claim 34 wherein said stored program contains instructions which, upon actuation of one of said switches, causes said microprocessor to direct the acoustic coupling of said access number and one of said sequences of numbers to said telephone system.

36. The terminal of claim 35 wherein said stored program contains instructions which, upon actuation of one of said switches, causes said microprocessor to direct the acoustic coupling of said access number to said telephone system, followed by a time delay prior to acoustically coupling one of said sequences of numbers to said telephone system.

37. The terminal of claim 36 wherein said stored program contains instructions which, upon actuation of one of said switches, causes said microprocessor to direct the acoustic coupling of said access number to said telephone system, and inhibits the acoustic coupling of any of said sequences of numbers to said telephone system without further actuation of one of said switches.

38. A data telecommunications terminal for use with a telephone system comprising:
  (i) a keyboard comprising a plurality of switches for inputting numbers and directing the storage and transmission of said numbers;
  (ii) a signal generator;
  (iii) memory means for storing a plurality of sequences of said numbers and at least one access number of at least one digit; said memory means having a buffer portion adapted to temporarily store said data stored in other portions of said memory means and said data from said keyboard;

(iv) a microprocessor coupled to said keyboard, said signal generator, and said memory means, said microprocessor comprising a stored program containing a set of instructions, and control lines for providing commands which selectively direct said memory means to store said sequences of numbers and said signal generator to generate dual-frequency signals corresponding to said numbers;

(v) signal coupling means coupled to said signal generator for acoustically coupling said dual-frequency signals to said telephone system;

(vi) display means coupled to said microprocessor for displaying said numbers; and (vii) self-contained power control means coupled to said memory means, said microprocessor means and said keyboard, said power control means adapted to provide voltage substantialy only during actuation of said switches, whereby upon actuation of one of said switches, instructions in said stored program causes said microprocessor to direct the acoustic coupling of one of said sequences of numbers to said telephone system and said stored program further contains instructions which, upon the sequential actuation of three switches, causes said microprocessor to direct the transfer of one said sequence of numbers from one location to another location within said memory means.

39. A data telecommunications terminal for use with a telephone system comprising:

(i) a keyboard comprising a plurality of switches for inputting numbers and directing the storage and transmission of said numbers;

(ii) a signal generator;

(iii) memory means for storing a plurality of sequences of said numbers;

(iv) a microprocessor coupled to said keyboard, said signal generator, and said memory means, said microprocessor comprising a stored program containing a set of instructions, and control lines for providing commands which selectively direct said memory means to store said sequences of numbers and said signal generator to generate dual-frequency signals corresponding to said numbers;

(v) signal coupling means coupled to said signal generator for acoustically coupling said dual-frequency signals to said telephone system;

(vi) display means coupled to said microprocessor for displaying said numbers; and (vii) self-contained power control means coupled to said memory means, said microprocessor means and said keyboard, said power control means adapted to provide voltage substantialy only during actuation of said switches, whereby upon the sequential actuation of three said switches, instructions in said stored program cause said microprocessor to direct the transfer of one said sequence of numbers from one location to another location within said memory means.

40. The terminal of claim 39 wherein said stored program contains instructions which, upon actuation of one of said switches, causes said microprocessor to direct the acoustic coupling of a portion of one of said sequences of numbers to said telephone system.

41. The terminal of claim 40 wherein said memory means is further adapted to store at least one access number of at least one digit, and said stored program contains instructions which, upon actuation of one of said switches, causes said microprocessor to direct the acoustic coupling of said access number to said telephone system, followed by a time delay prior to acoustically coupling one of said sequences of numbers to said telephone system.

42. The terminal of claim 41 wherein said memory means comprises a buffer portion adapted to temporarily store said data stored in other portions of said memory means and said data from said keyboard.

* * * * *